(12) United States Patent
Williams

(10) Patent No.: US 6,718,664 B2
(45) Date of Patent: Apr. 13, 2004

(54) CONTAINER HAVING IMAGE-CARRYING SHEET AND METHOD OF MANUFACTURING SUCH CONTAINER

(75) Inventor: Bruce A. Williams, Shelbyville, IN (US)

(73) Assignee: Williams Industries, Shelbyville, IN (US)

( * ) Notice: Subject to any disclaimer, the term of this patent is extended or adjusted under 35 U.S.C. 154(b) by 0 days.

(21) Appl. No.: 10/039,216

(22) Filed: Jan. 3, 2002

(65) Prior Publication Data

US 2003/0121189 A1 Jul. 3, 2003

(51) Int. Cl.⁷ .................................................. G09F 3/00
(52) U.S. Cl. ......................... 40/324; 40/454; D7/396.2
(58) Field of Search ........................... 40/324, 310, 306, 40/454; D7/396.2

(56) References Cited

U.S. PATENT DOCUMENTS

| | | |
|---|---|---|
| 2,499,453 A | 3/1950 | Bonnet |
| 3,119,195 A | 1/1964 | Braunhut |
| 4,218,204 A | 8/1980 | Edwards |
| 4,236,954 A | 12/1980 | Edwards |
| 4,680,000 A | 7/1987 | Nowicki et al. |
| 4,721,451 A | 1/1988 | Darr et al. |
| 4,737,098 A | 4/1988 | Oles et al. |
| 4,769,205 A | 9/1988 | Oles et al. |
| 4,973,241 A | 11/1990 | Keyser |
| 5,003,915 A | 4/1991 | D'Amato et al. |
| 5,032,344 A | 7/1991 | Kaminski |
| 5,098,302 A | 3/1992 | Sekiguchi |
| 5,113,213 A | 5/1992 | Sandor et al. |
| 5,181,471 A | 1/1993 | Sillars |
| 5,192,554 A | 3/1993 | Savich |
| 5,330,799 A | 7/1994 | Sandor et al. |
| 5,332,542 A | 7/1994 | Yamanaka et al. |
| 5,364,274 A | 11/1994 | Sekiguchi |
| 5,368,798 A | 11/1994 | Mizukoshi et al. |
| 5,448,844 A * | 9/1995 | Miller et al. .................. 40/306 |
| 5,457,515 A | 10/1995 | Quadracci et al. |
| 5,494,445 A | 2/1996 | Sekiguchi et al. |
| 5,520,876 A | 5/1996 | Dobler |
| 5,525,383 A | 6/1996 | Witkowski |

(List continued on next page.)

FOREIGN PATENT DOCUMENTS

| | | |
|---|---|---|
| EP | 0812668 A1 | 12/1997 |
| EP | 0818708 A1 | 1/1998 |
| EP | 1014169 A1 | 6/2000 |
| WO | WO 97/02312 | 1/1997 |
| WO | WO 99/41156 | 8/1999 |
| WO | WO 00/09319 | 2/2000 |
| WO | WO 00/63016 | 10/2000 |
| WO | WO 01/96079 A2 | 12/2001 |

OTHER PUBLICATIONS

Provisional patent application No. 60/233,293, filed Sep. 15, 2000, for "Plastic Container Having an Integral Lenticular Sheath and Method for Making Same", Inventors Falzarano and Mithal (copy unavailable).

Provisional patent application No. 60/257,588, filed Dec. 22, 2000, for "Method of Protecting Ink and Providing Enhanced Bonding During Molding of Lenticular Lens Sheets in Plastic Objects", Inventor Richard Guest (copy unavailable).

Prior art Atlanta Hawks cup, two digital photos, date unknown (Photos A and B).

Prior art ice cream containers, four digital photos, date unknown (Photos C, D, E, F).

*Primary Examiner*—Gary Hoge

(57) ABSTRACT

Drink containers with a variety of shapes are disclosed. Each drink container has a shell and an image-carrying sheet molded into the shell. In some embodiments, the image-carrying sheet is a sheet of lenticular lens material. A method of manufacturing the various illustrative drink containers is also disclosed.

24 Claims, 21 Drawing Sheets

U.S. PATENT DOCUMENTS

| | | |
|---|---|---|
| 5,554,432 A | 9/1996 | Sandor et al. |
| 5,560,799 A | 10/1996 | Jacobsen |
| 5,604,006 A | 2/1997 | Ponchaud et al. |
| 5,614,146 A | 3/1997 | Nakamura et al. |
| 5,642,226 A | 6/1997 | Rosenthal |
| 5,695,346 A | 12/1997 | Sekiguchi et al. |
| 5,696,596 A | 12/1997 | Taniguchi |
| 5,705,255 A | 1/1998 | Grazioli |
| 5,733,615 A | 3/1998 | Rackovan et al. |
| 5,753,344 A | 5/1998 | Jacobsen |
| 5,811,163 A | 9/1998 | Ohno et al. |
| 5,812,152 A | 9/1998 | Torigoe et al. |
| 5,908,590 A | 6/1999 | Yoshimi et al. |
| 5,924,870 A | 7/1999 | Brosh et al. |
| 5,941,382 A | 8/1999 | Fantone et al. |
| 5,967,032 A | 10/1999 | Bravenec et al. |
| 6,004,682 A | 12/1999 | Rackovan et al. |
| 6,007,759 A | 12/1999 | Tije et al. |
| 6,026,215 A | 2/2000 | Fantone et al. |
| 6,047,849 A | 4/2000 | Schwegman et al. |
| 6,060,003 A | 5/2000 | Karszes |
| 6,073,854 A | 6/2000 | Bravenec et al. |
| 6,133,928 A | 10/2000 | Kayashima et al. |
| 6,144,496 A | 11/2000 | Goto |
| 6,148,724 A | 11/2000 | Hart et al. |
| 6,193,146 B1 * | 2/2001 | Morrow et al. ............... 40/310 |
| 6,195,150 B1 | 2/2001 | Silverbrook |
| 6,239,068 B1 | 5/2001 | Tutt et al. |
| 6,256,150 B1 | 7/2001 | Rosenthal |
| 6,373,637 B1 | 4/2002 | Gulick, Jr. et al. |
| 6,490,093 B2 | 12/2002 | Guest |
| 2002/0038917 A1 | 4/2002 | McKee |

* cited by examiner

CONTAINER HAVING IMAGE-CARRYING SHEET AND METHOD OF MANUFACTURING SUCH CONTAINER

BACKGROUND AND SUMMARY

The present disclosure relates to containers and particularly, to plastic containers such as drinking cups. More particularly, the present disclosure relates to molded drink containers having image-carrying sheets and a method of manufacturing molded drink containers having image-carrying sheets.

Containers, such as drinking cups or tumblers, that are molded from plastic and that display images on the outer surfaces of the containers are known. Drinks are oftentimes sold in such containers at fast food restaurants, gas stations, movie theaters, and sports venues. Such containers may also be sold separately at retail outlets. The images carried by these containers sometimes promote movies, sports teams, athletes, entertainers, and the like. Image-carrying sheets of material, such as lenticular lens sheets which have optical properties that produce a 3-D effect, are also known and have been attached to containers in recent times to enhance the aesthetics of the containers. See, for example, U.S. Pat. No. 5,494,445.

Lenticular lens sheets are made of multiple layers of material and have been known to separate or fray, especially along the edges of the sheets, as a result of general wear and tear. Thus, lenticular lens sheets are sometimes embedded into their respective containers such that the edges of the sheets are surrounded and protected by the material from which the container is made in order to minimize separation or fraying of the layers of lenticular lens sheets around the edges. If a container is made of plastic, for example, molding the plastic material around the edges of the lenticular lens sheet achieves the desired result. However, in some conventional molding processes, such as injection molding, the lenticular lens sheets have been known to buckle within a mold cavity as a result of molten plastic being injected into the mold cavity. The containers disclosed herein are configured to minimize buckling of image-carrying sheets, such as lenticular lens sheets, during the associated manufacturing process.

According to the present disclosure, a molded container comprises a container wall defining an axis of the molded container and an image-carrying sheet molded into the container wall. The container wall has a top edge and a bottom edge. The molded container further comprises a radially extending disk having an outer periphery appended to the container wall between the top edge and the bottom edge of the container wall. The image-carrying sheet has a top edge above the disk and a bottom edge below the disk.

In one illustrative embodiment, the disk serves as a bottom wall of the molded container and cooperates with the container wall to define a drink-receiving space above the bottom wall. In other illustrative embodiments, the disk has a central opening and the drink container further comprises a bottom portion appended to the disk and extending downwardly from the disk. The bottom portion is formed to include a lower drink-receiving space and the portion of the container wall above the disk defines an upper drink-receiving space. The lower drink-receiving space is in fluid communication with the upper drink-receiving space through the central opening. Also according to this disclosure, one or more notches are formed in the lower edge of the container wall beneath the image-carrying sheet. In some embodiments, the image-carrying sheet comprises a sheet of lenticular lens material. A method of manufacturing the various illustrative molded containers is also disclosed.

Additional features will become apparent to those skilled in the art upon consideration of the following detailed description of illustrative embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figure 1:
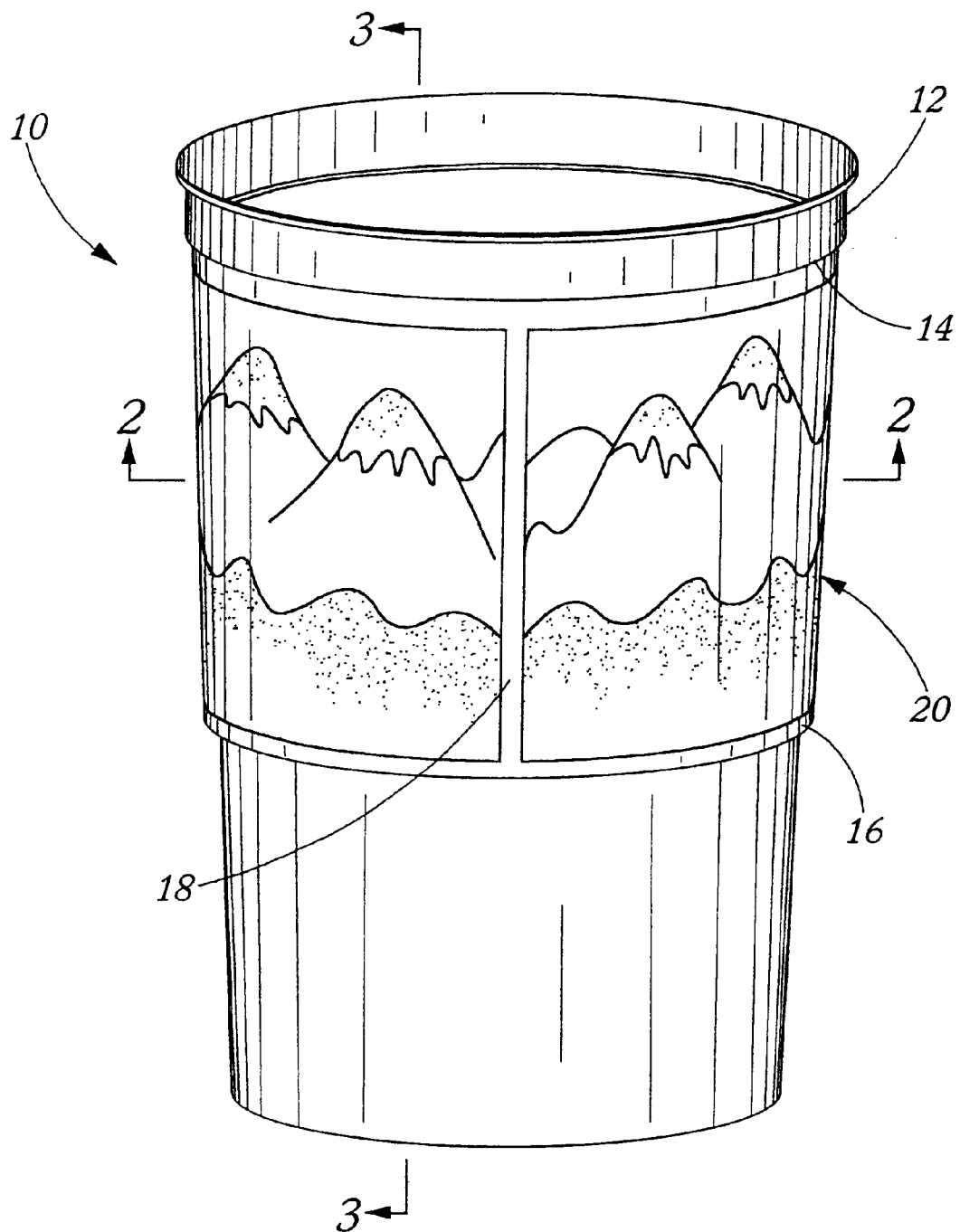
FIG. 1 is a perspective view showing a molded drink container according to the present disclosure having a main container wall into which an image-carrying sheet is molded.
Figure 2:
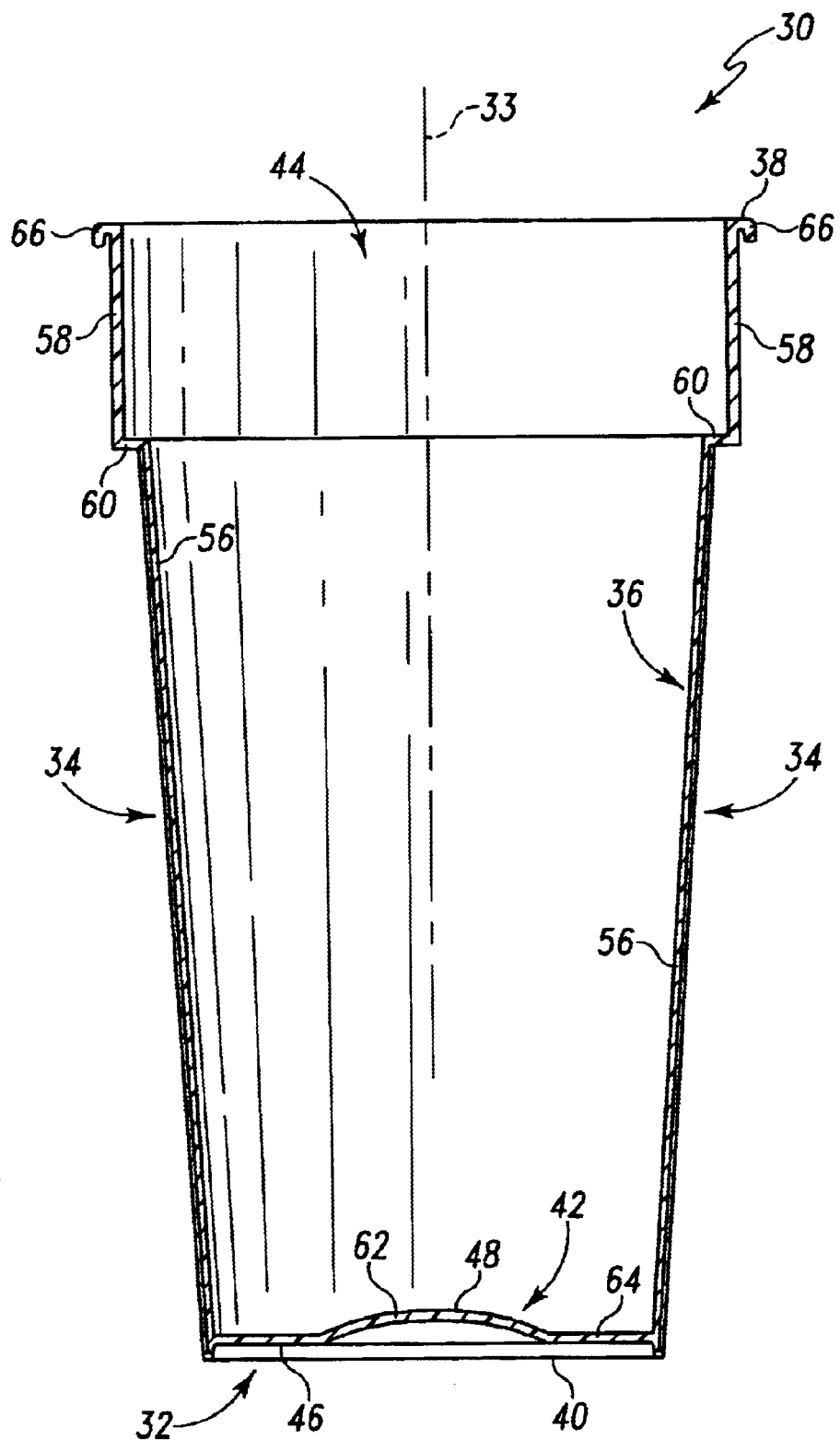
FIG. 2 is a cross sectional view of the molded drink container of FIG. 1, taken along a vertical plane passing through a central axis defined by the main container wall.

A molded drink container 30 in accordance with this disclosure comprises a plastic shell 32 and an image-carrying sheet 34 molded into shell 32 as shown in FIG. 1. Shell 32 is made of any suitable material that is capable of being injection molded. Thus, shell 32 may be made of high density polyethylene (HDPE), polypropylene, or other suitable plastic material. Shell 32 includes a main container wall 36 having a circular top edge 38 and a substantially circular bottom edge 40 as shown in FIGS. 1 and 2. Top edge 38 defines an open mouth at the top of container 30. Shell 32 further includes a disk or bottom wall 42 that is appended to main container wall 36 near bottom edge 40 as shown in FIG. 2. Main container wall 36 cooperates with bottom wall 42 to define a drink-receiving space 44 above bottom wall 42.

Although container 30 may be sized to contain any desired amount of liquid in drink-receiving space 44, according to the illustrative embodiment of container 30, drink-receiving space 44 is configured to hold thirty-two ounces of liquid. Thus, illustrative container 30 is well-suited for use as a large-size drinking cup at fast food restaurants, gas stations, movie theaters, sports venues, and the like. Image-carrying sheet 34 has one or more images that promote, for example, movies, sports teams, musical groups, cartoons, motor sports, and the like, as well as the individuals associated with these. It will be appreciated that sheet 34 may have any desired image in accordance with this disclosure.

Shell 32 has a vertical central axis 33 as shown in FIG. 2. Edges 38, 40 have centers that lie on axis 33 and wall 36 extends substantially in an axial direction between edges 38, 40. Bottom wall 42 extends substantially radially with respect to axis 33. Thus, shell 32 is substantially symmetric about axis 33. Bottom wall 42 has a bottom surface 46 facing away from drink-receiving space 44 and a top surface 48 that defines the bottom of drink-receiving space 44 as shown in FIG. 2. A portion of wall 36 extends downwardly from bottom wall 42, and therefore, bottom edge 40 of wall 36 is positioned to lie below bottom surface 46.

Figure 3:
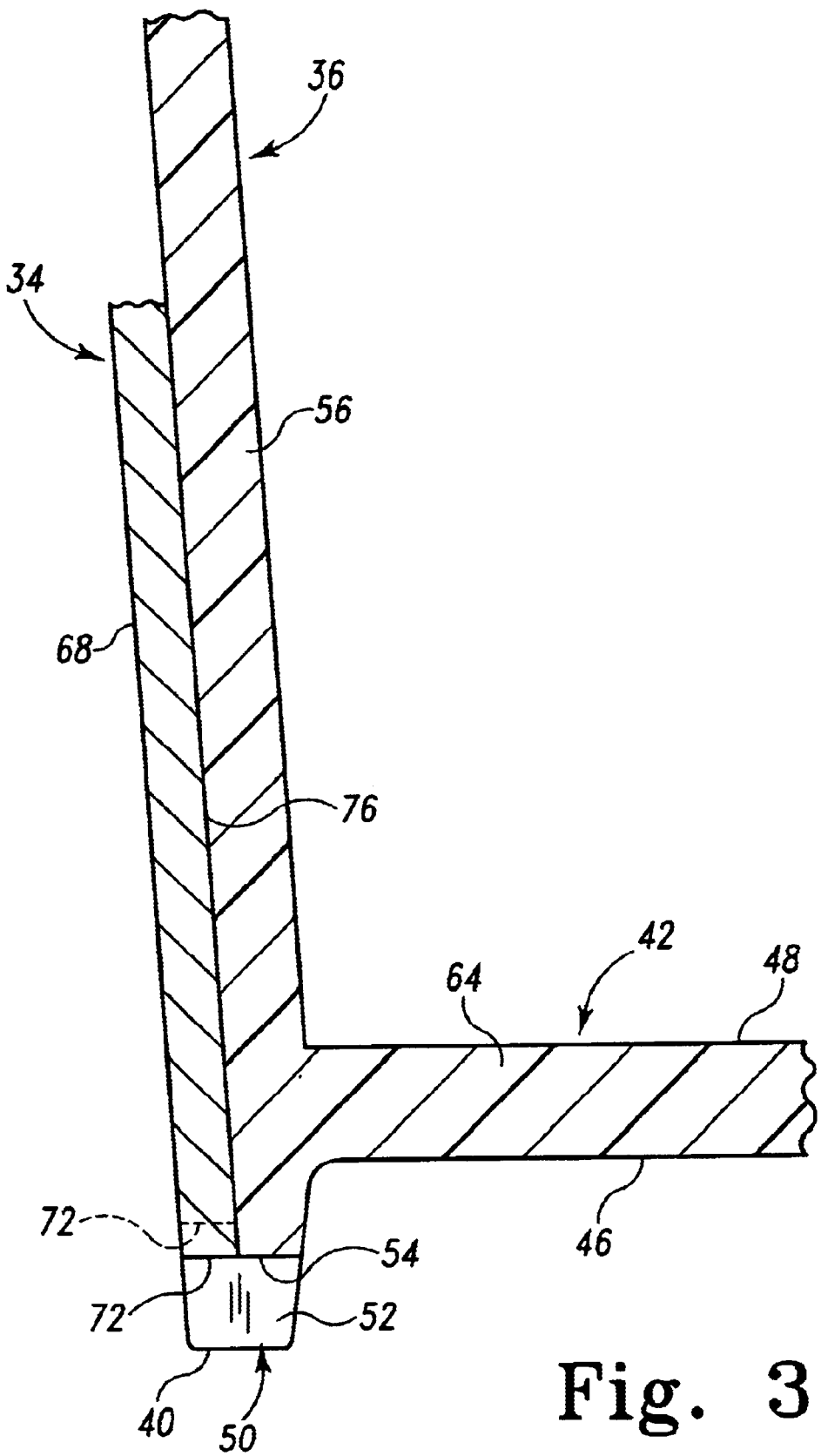
FIG. 3 is an enlarged cross sectional view of a portion of the molded drink container of FIG. 2 showing a bottom wall of the molded container appended to the main container wall and having a downwardly facing bottom surface that is higher in elevation than a bottom edge of the image-carrying sheet.

Bottom edge 40 is formed to include four, relatively small notches 50 as shown in FIGS. 1–3. Each notch 50 is open at its bottom. In addition, each notch 50 is bounded by a pair of vertical side edges 52 and a horizontal upper edge 54. Upper edge 54 of each notch 50 is positioned below bottom surface 46 of bottom wall 42 and above bottom edge 40 of container wall 36 as shown in FIG. 3. Each notch 50 is circumferentially spaced apart from each of the next adjacent notches 50 by ninety degrees. It is within the scope of this disclosure for more or less than four notches 50 to be provided along bottom edge 40 of wall 36.

Illustrative main container wall 36 includes a first annular portion 56 extending axially upwardly from bottom edge 40, a second annular portion 58 extending axially downwardly from top edge 38, and a radially extending shoulder portion 60 that interconnects first and second annular portions 56, 58 as shown best in FIG. 2. Annular portion 58 is substantially cylindrical. Annular portion 56 is slightly frustoconical and therefore, tapers inwardly by a small amount from shoulder portion 60 to bottom edge 40. Wall 36 also includes an upper lip 66 that extends downwardly from top edge 38 by a small amount. Lip 66 is configured to retain a removable lid (not shown) that is coupled to container 30 in some embodiments. Bottom wall 42 has a somewhat dome-shaped central portion 62 and a substantially flat portion 64 radially outward of central portion 62 as shown in FIG. 2.

Figure 4:
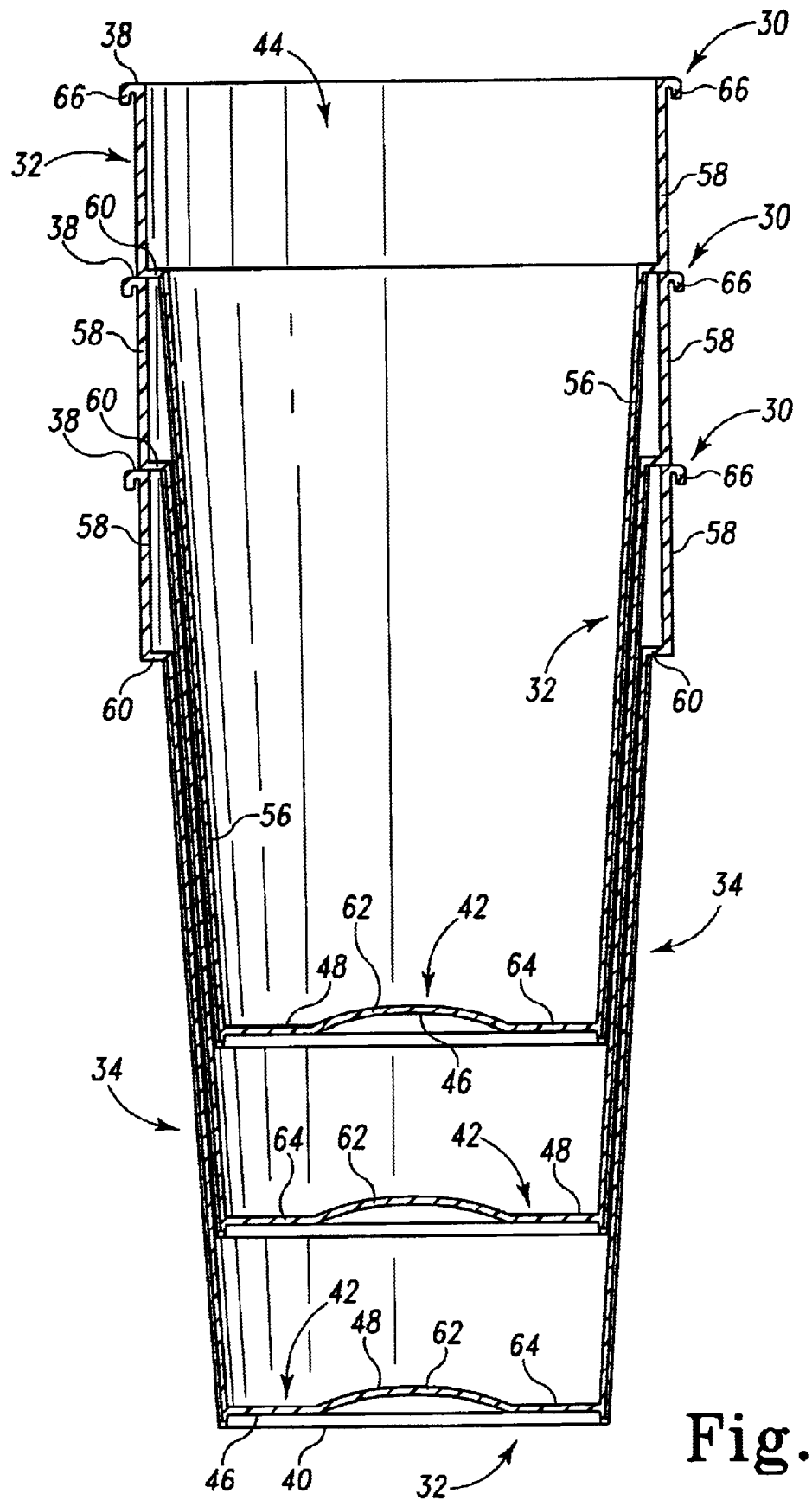
FIG. 4 is a cross sectional view of three stacked drink containers similar to the drink container of FIGS. 1 and 2.

Container 30 is stackable with other containers of similar or identical construction as shown in FIG. 4. When stacked with top edges 38 facing upwardly, as shown in FIG. 4, shoulder portion 60 of each container 30 engages top edge 38 of the next adjacent, underlying container 30. Contact between portions 60 and edges 38 prevents walls 36 from becoming inadvertently tightly wedged together.

Image-carrying sheet 34 is molded into shell 32 as mentioned above. Specifically, sheet 34 is molded into portion 56 of wall 36 such that an external surface 68 of sheet 34, which faces away from drink-receiving space 44, is exposed to enable an image carried by or included in sheet 34 to be seen. In exemplary embodiments, sheet 34 is a lenticular lens sheet of material having an image with a 3D effect. However, it is within the scope of this disclosure for sheet 34 to be any type of sheet that carries one or more images or that has one or more images formed or printed thereon.

Figure 5:
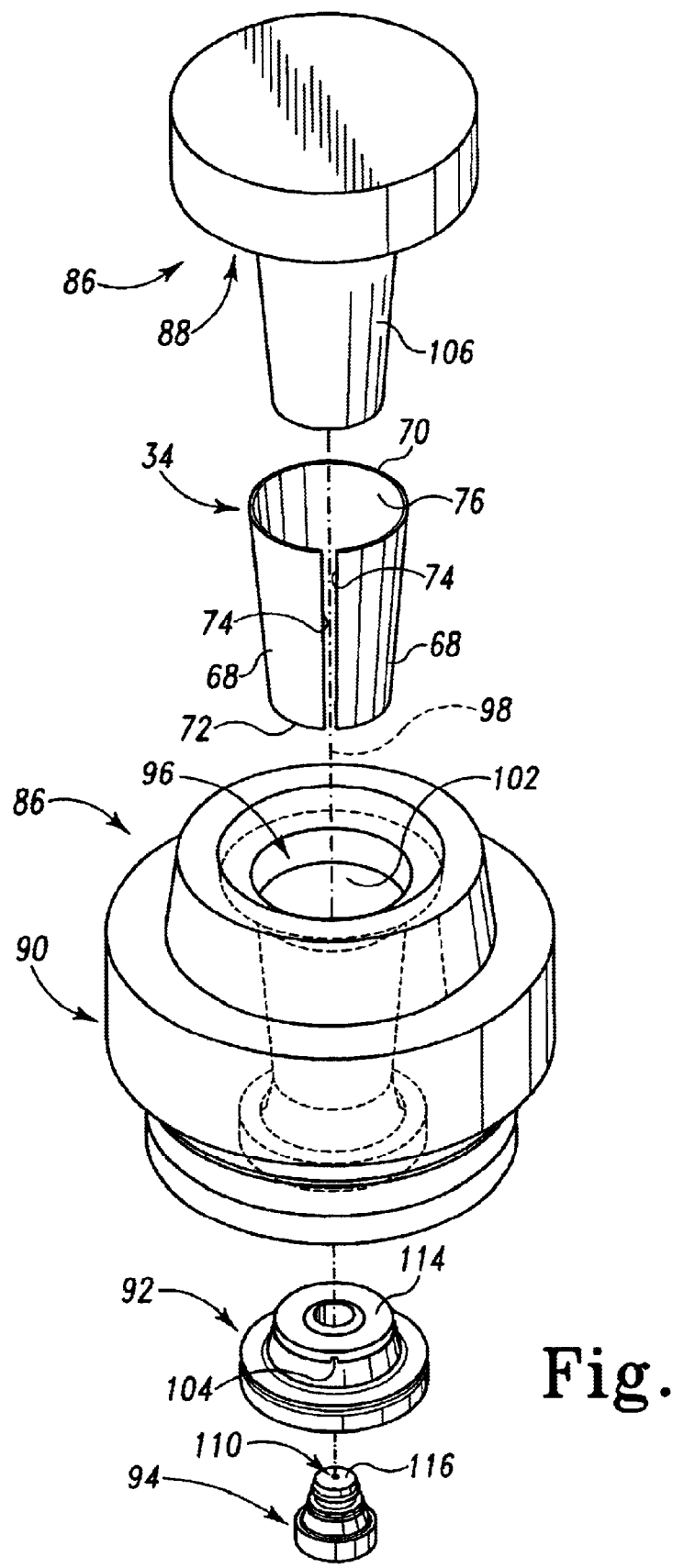
FIG. 5 is an exploded perspective view of a die set used to injection mold the drink container of FIG. 1 showing a male die of the die set at the top of the page, an image-carrying sheet beneath the male die, the image-carrying sheet being curled for insertion into a central bore of a female die of the die set situated beneath the sheet, a gate of the die set beneath the female die, and a gate insert of the die set beneath the gate.

Sheet 34 has a top edge 70, a bottom edge 72, and a pair of side edges 74 extending between top edge 70 and bottom edge 72 as shown best in FIG. 5. Sheet 34 wraps around almost all of portion 56 of container wall 36 as shown best in FIG. 1. However, each side edge 74 is spaced apart from and confronts the other side edge 74 such that a vertically extending gap is defined between side edges 74. Because portion 56 of wall 36 is slightly frustoconical in shape, the length of top edge 70 is longer than the length of bottom edge 72 so that the vertical gap between edges 74 is substantially uniform from top to bottom.

The plastic material from which shell 32 is molded coats a back surface 76 of sheet 34 and fills the vertically extending space between side edges 74. In addition, a portion of the plastic material from which shell 32 is molded fills the space between bottom edge 72 of sheet 34 and bottom edge 40 of wall 36. Similarly, a portion of the plastic material from which shell 32 is molded fills the space between top edge 70 of sheet 34 and shoulder portion 60. Thus, portion 56 of container wall 36 has a ring 78 of plastic material above top edge 70 of sheet 34, a ring 80 of plastic material beneath bottom edge 72 of sheet 34, and a ridge 82 of plastic material extending vertically between rings 78, 80 as shown in FIG. 1. The outer surfaces of ridge 82 and rings 78, 80 cooperate with external surface 68 of sheet 34 to provide container 30 with a generally smooth frustoconical outer surface beneath shoulder portion 60.

Container 30 is configured so that bottom edge 72 of sheet 34 is positioned to lie below bottom surface 46 of bottom wall 42 and above bottom edge 40 of container wall 36 as shown in FIG. 3. Depending upon factors associated with the manufacture of container 30, as will be discussed in greater detail below, bottom edge 72 of sheet 34 will be either substantially coplanar with upper edges 54 of notches 50, as shown in FIG. 3 (in solid), or positioned slightly higher in elevation than upper edges 54 of notches 50, as shown in FIG. 3 (in phantom). If bottom edge 72 is positioned slightly higher in elevation than upper edges 54 of notches 50, then a small portion 84 of the plastic material from which container 30 is molded fills the small vertical space between bottom edge 72 of sheet 34 and upper edges 54 of notches 50 as shown in FIG. 1. Portions 84 interconnect the segments of ring 80 lying on either side of notches 50.

Figure 6:
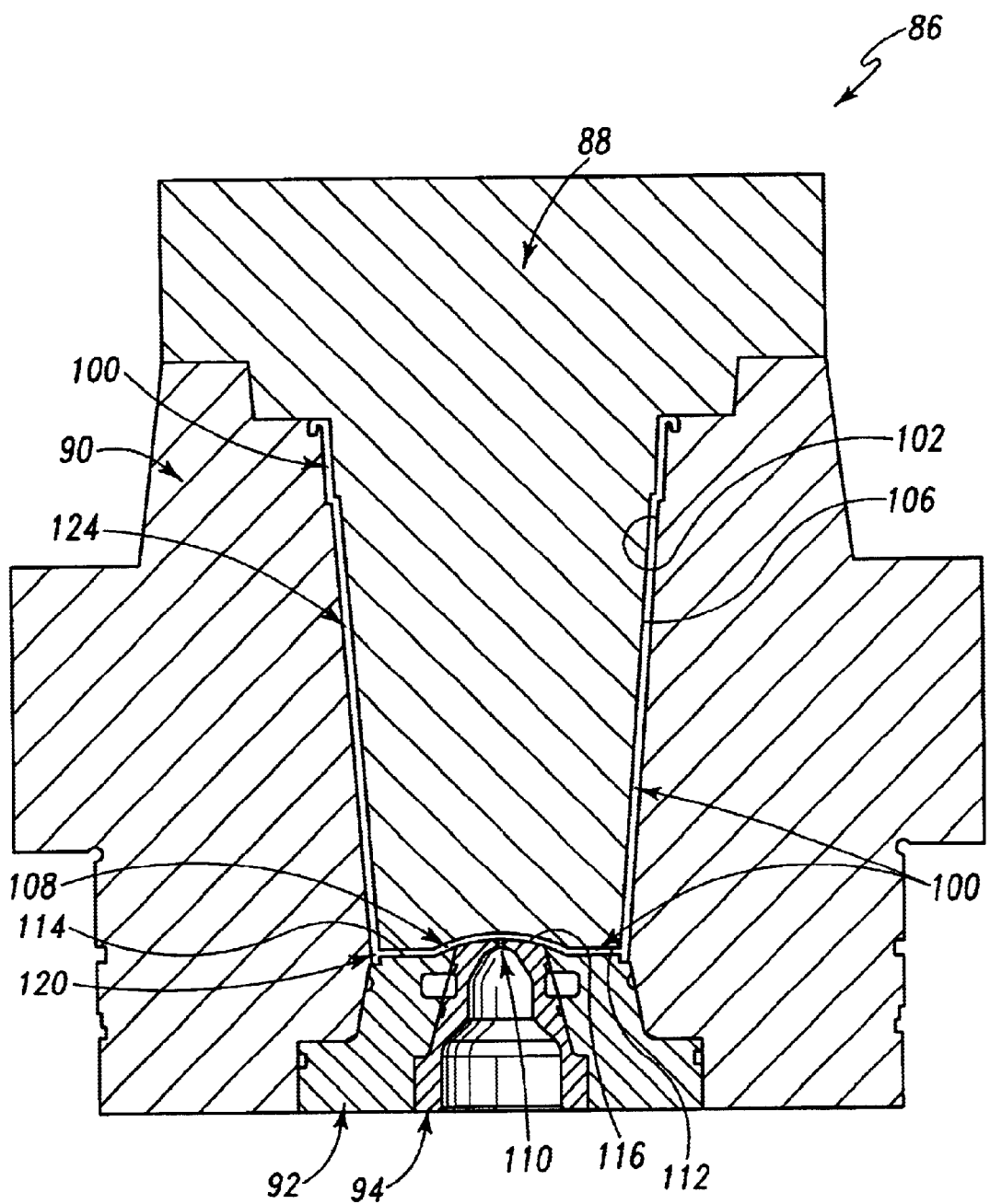
FIG. 6 is a cross sectional view of the die set of FIG. 5 showing a plastic-receiving space being defined between portions of the female die, the male die, the gate, and the gate insert.

Container 30 is manufactured by an injection molding process using a die set 86 having a male die 88, a female die 90, a gate 92, and a gate insert 94 as shown in FIGS. 5 and 6. Female die 90 has a bore or mold cavity 96 therethrough which defines an axis 98 as shown in FIG. 5. Male die 88 is received in the upper portion of bore 96 and both gate 90 and gate insert 94 are received in the lower portion of bore 96 such that a plastic-receiving space 100 is created between portions of male die 88, female die 90, gate 92, and gate insert 94 as shown in FIG. 6. Those skilled in the art will appreciate that dies 88, 90, gate 92, and gate insert 94 may include internal passages through which coolant is circulated and may also include one or more tap holes or the like for connection of other components of the associated injection molding equipment, such as equipment that controls the movement of the various components of die set 86. Such passages, tap holes, associated equipment and the like are omitted from the drawings in this disclosure for the sake of clarity.

Figure 7:
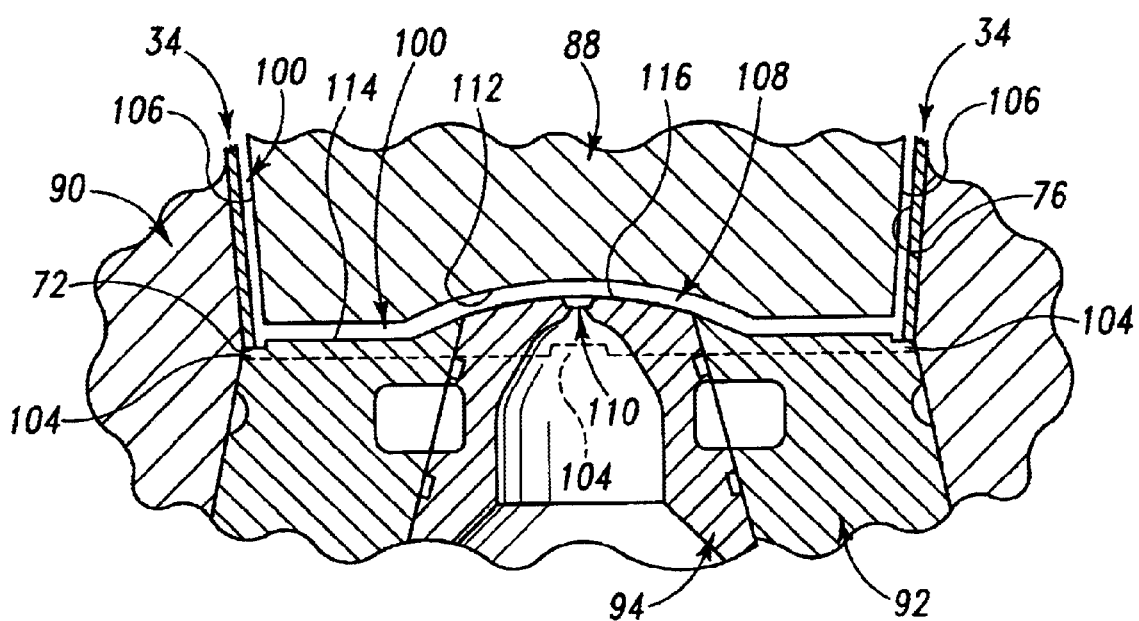
FIG. 7 is an enlarged cross sectional view of a portion of the die set of FIG. 5 showing the plastic-receiving space having a horizontal disk-like space defined beneath a bottom surface of the male die and above upper surfaces of the gate and the gate insert, a set of standoffs located in an annular groove of the plastic-receiving space beneath the disk-like space, and a bottom edge of the image-carrying sheet resting upon the standoffs.

After gate 90 and gate insert 94 are situated in the lower portion of mold cavity 96 and before male die 88 is lowered into mold cavity 96, sheet 34 is curled into the configuration shown in FIG. 5 and is inserted into mold cavity 96 so that external surface 68 of sheet 34 abuts a frustoconical surface 102 of female die 90. Gate 92 has a set of four standoffs 104 upon which bottom edge 72 of sheet 34 rests when sheet 34 is inserted into mold cavity 96 as shown in FIG. 7. Sheet 34 is normally flat and therefore, mechanical stress established in sheet 34 as a result of curling sheet 34 has a tendency to bias sheet 34 against surface 102 of die 90. After sheet 34 is inserted into mold cavity 96, male die 88 is lowered into mold cavity 96 such that a frustoconical surface 106 of male die 88 is spaced apart from back surface 76 of sheet 34 as shown, for example, in FIG. 7.

Gate insert 94 has a small aperture 110 centered on axis 98. During the manufacture of container 30, molten plastic material is injected into plastic receiving space 100 through aperture 110. The injected molten plastic exiting aperture 110 flows radially outwardly in a horizontal disk-like portion 108 of plastic-receiving space 100 in a direction indicated by arrow 117 shown in FIG. 8. The horizontal disk-like portion 108 of space 100 is defined between a downwardly facing bottom surface 112 of male die 88 and upwardly facing surfaces 114, 116 of gate 92 and gate insert 94, respectively, as shown best in FIG. 7. Disk-like portion 108 has a domed central region and an annular outer region which terminates at a circular outer periphery.

Figure 8:
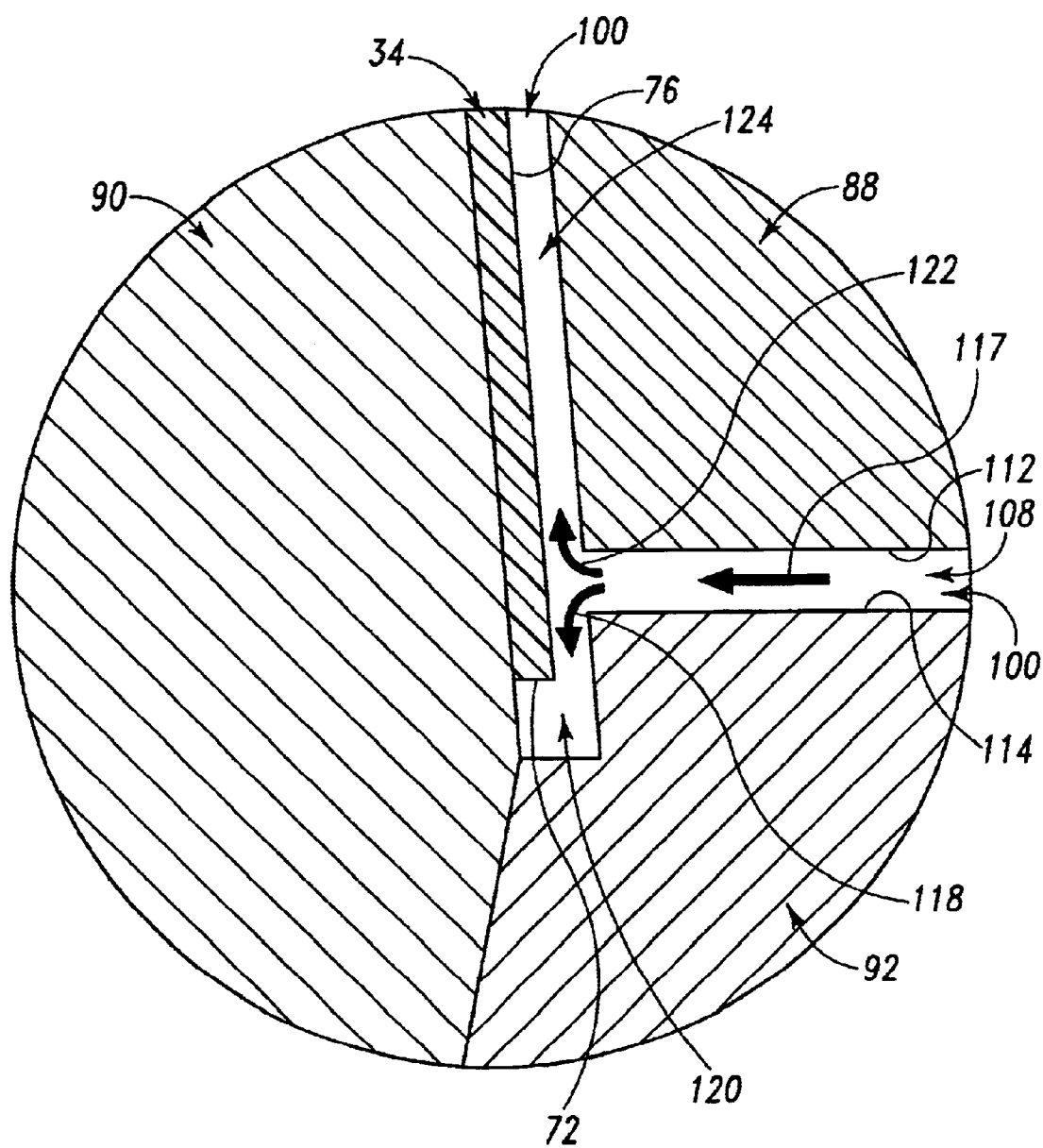
FIG. 8 is an enlarged cross sectional view of a portion of the die set of FIG. 6 showing a set of arrows indicating the direction of molten plastic flow in the plastic-receiving space during injection of the molten plastic into the plastic-receiving space to form the molded drink container.

As the molten plastic flows radially outwardly in direction 117 past the circular outer periphery of disk-like portion 108 of space 100, some of the molten plastic flows downwardly in a direction indicated by arrow 118, shown in FIG. 8, toward bottom edge 72 of sheet 34 and into a lower annular portion 120 of plastic-receiving space 100, and some of the molten plastic flows upwardly in a direction indicated by arrow 122, shown in FIG. 8, into a main annular portion 124 of space 100 and toward top edge 70 of sheet 34. Because bottom edge 72 of sheet 34 is beneath each of surfaces 112, 114, 116 which define disk-like portion 108 of space 100, the molten plastic exiting the circular outer periphery of the disk-like portion of space 100 engages back surface 76 of sheet 34 before reaching the region of annular portion 120 beneath edge 72. Thus, as portion 120 of space 100 fills with molten plastic, the lower portion of sheet 34 is prevented from moving or buckling inwardly toward centerline 98 of die set 86 because the portion of space 100 that is radially inward of the lower portion of sheet 34 is filled with molten plastic before the molten plastic reaches edge 72 of sheet 34.

Bottom edge 72 of sheet 34 engages standoffs 104 when sheet 34 is placed in mold cavity 96 as previously mentioned. Standoffs 104 are situated in lower annular portion 120 of space 100. Thus, the molten plastic flowing in direction 118 into annular portion 120 of space 100 flows around standoffs 104 which results in the formation of notches 50 in container 30. Notches 50 prevent a significant amount of water from pooling on surface 146 when containers 30 are washed in a dishwasher. That is, when containers 30 having notches 50 are placed upside down in a dishwasher, a large portion of the water falling onto surface 146 drains through notches 50.

Some containers 30 have small portions 84 of plastic above upper edges 52 of notches 50 and below bottom edge 72 of sheet 34 as mentioned above. Thus, during the molding process, sheet 34 sometimes lifts off of standoffs 104 by a slight amount which allows the molten plastic to fill the space created between bottom edge 72 of sheet 34 and standoffs 104. It is believed that one or more of several factors may contribute to sheet 34 lifting off of standoffs 104. For example, if sheet 34 uncurls by a slight amount after placement in mold cavity 96, sheet will ride up on frustoconical surface 102 of female die 90.

It will be appreciated that, as molten plastic is injected into space 100, lower annular portion 120 of space 100 fills with molten plastic before main annular portion 124 fills with molten plastic. Therefore, viscous friction between the molten plastic flowing upwardly in direction 122 in portion 124 of space 100 will have a tendency to lift sheet 34 off of standoffs 104. In addition, as lower annular space 120 fills with molten plastic, the molten plastic engaging bottom edge 72 of sheet will have a tendency to lift sheet 34 off of standoffs 104.

It has been found that, even in those instances when sheet 34 lifts off of standoffs 104, sheet 34 moves by only a slight distance such that bottom edge 72 of sheet 34 remains at a position beneath surface 114 of gate 92. Having portions 84 of plastic between upper edges 52 of notches 50 and bottom edge 72 of sheet 34 protects the portions of bottom edge 72 above notches 50 from inadvertent impacts and, in those embodiments where sheet 34 is a sheet of lenticular lens material, prevents the layers of the lenticular lens material from fraying or separating.

A suitable volume of molten plastic is injected into die set 86 to fill all of space 100 except for the portion of space 100 occupied by sheet 34. Thus, the molten plastic injected into space 100 covers edges 70, 72, 74 of sheet 34 and coats back surface 76 of sheet 34. After the molten plastic in space 100 cools and solidifies by a sufficient amount, die set 86 is disassembled and the completed container 30 is removed from mold cavity 96.

Figure 9:
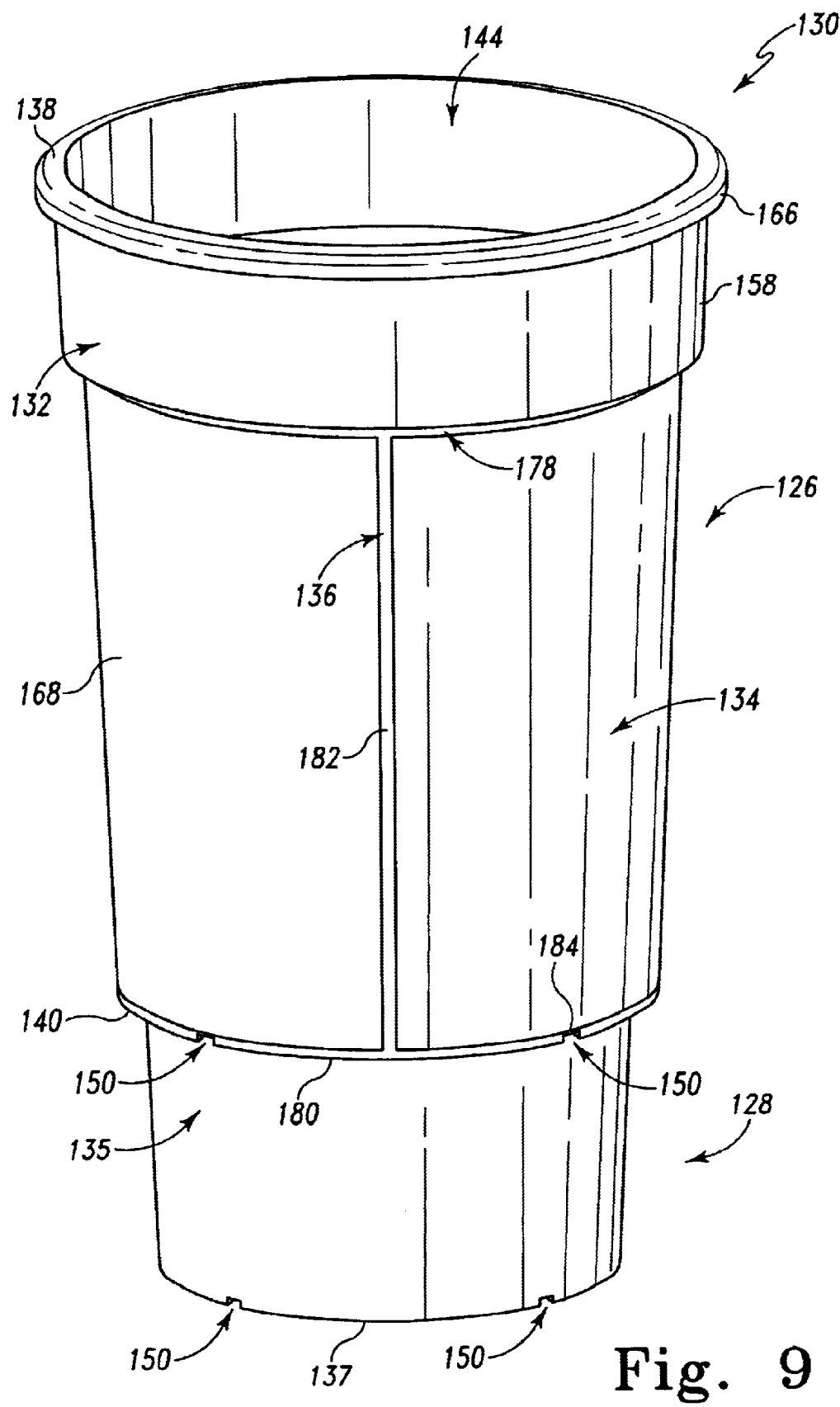
FIG. 9 is a perspective view showing another molded drink container according to the present disclosure having a large-diameter top portion with a main container wall into which an image-carrying sheet is molded and having a small-diameter bottom portion.
Figure 10:
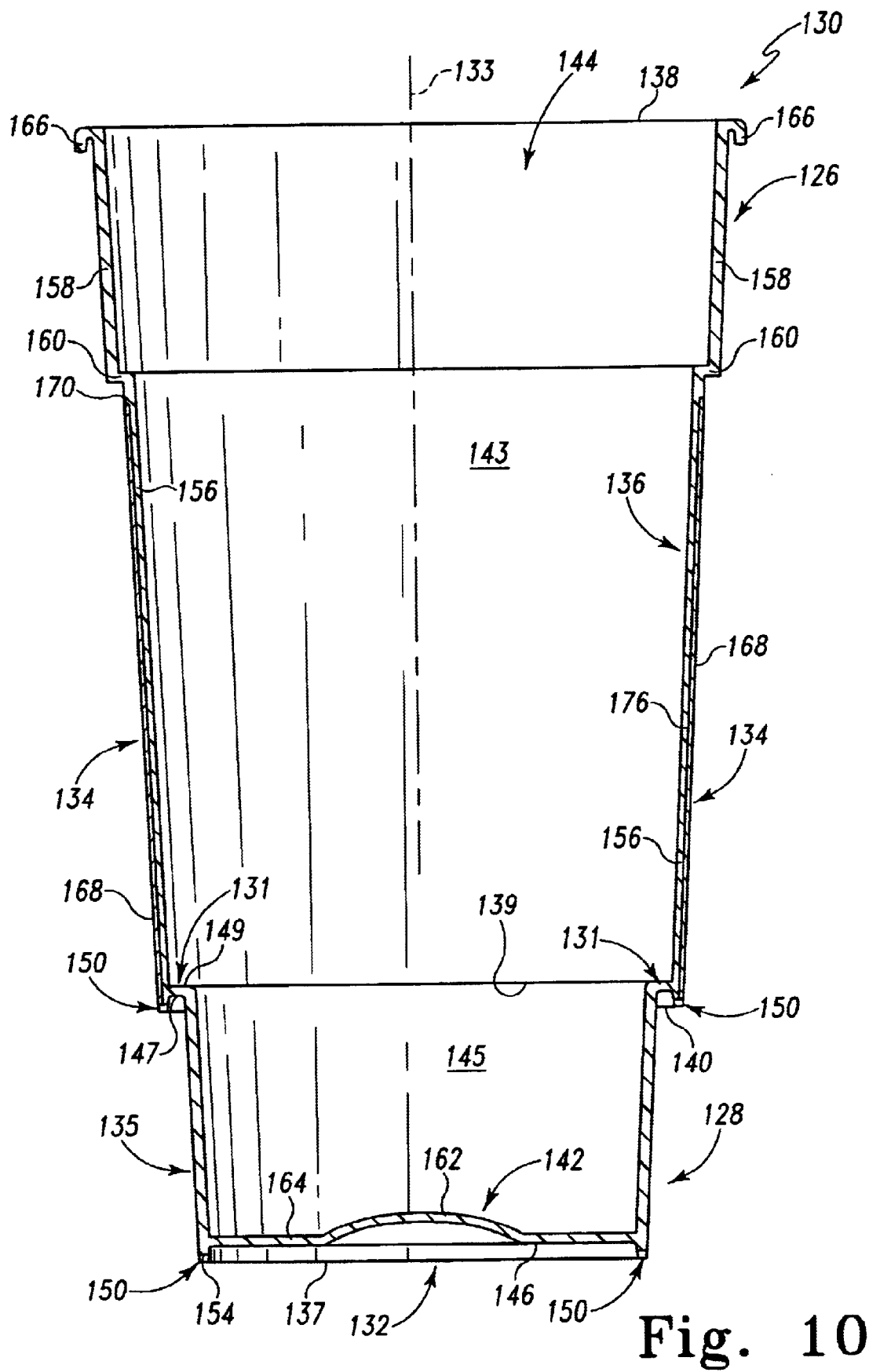
FIG. 10 is a cross sectional view of the molded drink container of FIG. 9, taken along a vertical plane passing through a central axis defined by the main container wall.
Figure 11:
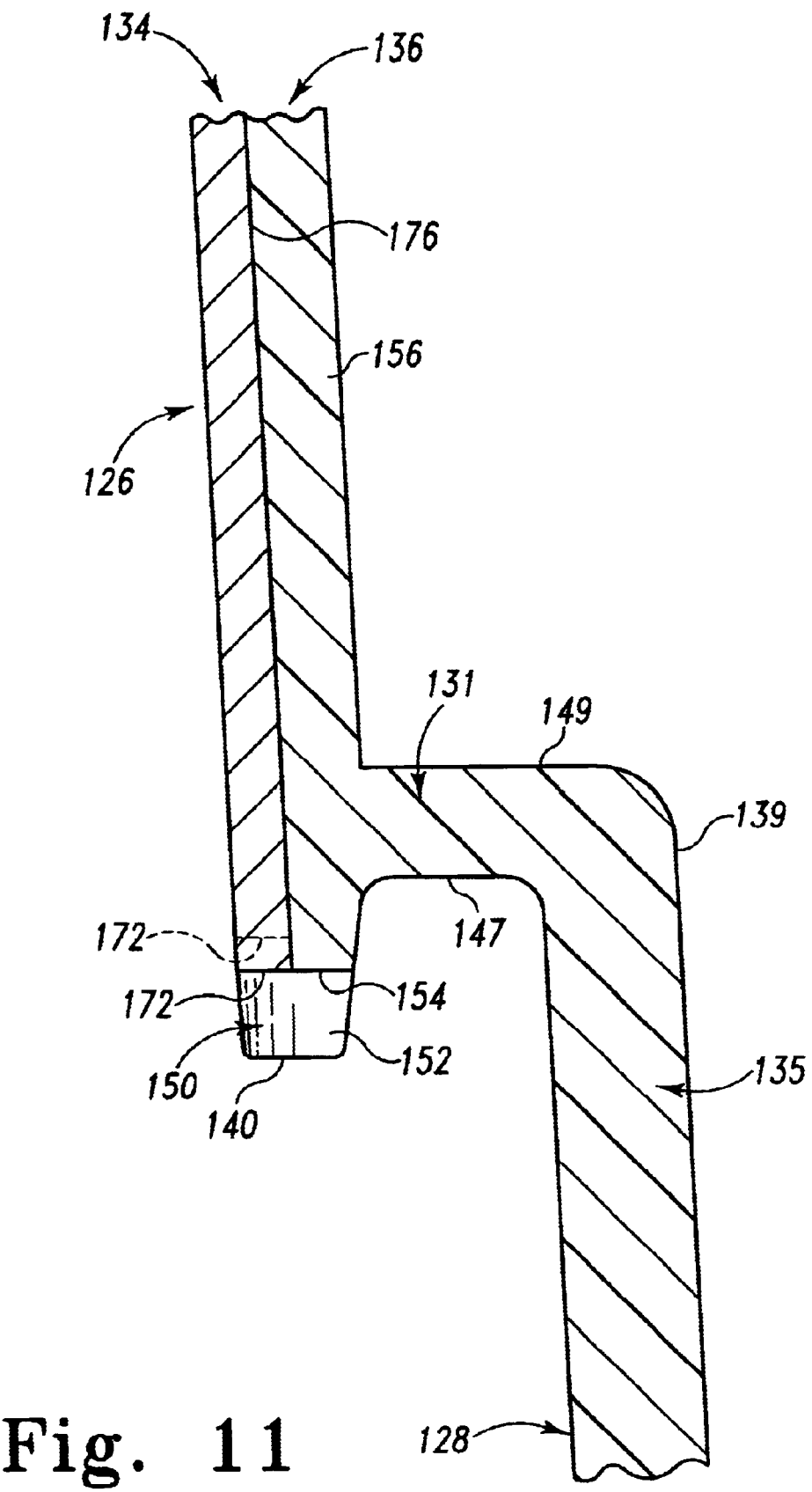
FIG. 11 is an enlarged cross sectional view of a portion of the molded drink container of FIG. 10 showing a radially extending disk of the molded drink container interconnecting a bottom region of the main container wall and an upper region of the bottom portion.

A first alternative embodiment of a molded drink container 130 in accordance with this disclosure is shown in FIGS. 9–11. Container 130 comprises a plastic shell 132 and an image-carrying sheet 134 molded into shell 132 as shown in FIG. 9. Shell 132 is made of any of the same materials from which shell 32 of container 30 is made. Shell 132 has a large-diameter upper portion 126 and a small diameter lower portion 128 beneath upper portion 126. Upper portion 126 of shell 132 includes a main container wall 136 having a substantially circular top edge 138 and a substantially circular bottom edge 140 as shown in FIGS. 9 and 10. Top edge 138 defines an open mouth at the top of container 130.

Container 130 further comprises a radially extending disk 131 that interconnects top portion 126 and bottom portion 128 as shown in FIG. 10. Bottom portion 128 of shell 132 includes a wall 135 that extends downwardly from the inner periphery of disk 131 and that terminates at a substantially circular bottom edge 137. Lower portion 128 of shell 132 further includes a disk or bottom wall 142 that is appended to wall 135 near bottom edge 137. Disk 131 has a large central opening 139 and disk 142 is solid. Container 130 has a drink-receiving space 144 including an upper drink-receiving space 143 associated with upper portion 126 and a lower drink-receiving space 145 associated with lower portion 128. Space 143 communicates with space 143 through opening 139 of disk 131.

Although container 130 may be sized to contain any desired amount of liquid in drink-receiving space 144, according to the illustrative embodiment of container 130, drink-receiving space 144 is configured to hold forty-four ounces of liquid. Thus, illustrative container 130 is well-suited for use as a super-size drinking cup at fast food restaurants, gas stations, movie theaters, sports venues, and the like. Lower portion 128 of container 130 is sized to fit into a drink holder formed in an armrest of a seat in a movie theater, for example. As was the case with image-carrying sheet 34 of container 30, image-carrying sheet 134 may have any desired image in accordance with this disclosure.

Shell 132 has a vertical central axis 133 as shown in FIG. 10. Circular edges 137, 138, 140 and circular opening 139 each have centers that lie on axis 133. In addition, wall 136 of upper portion 128 extends substantially in an axial direction between edges 138, 140 and wall 135 of lower portion 126 extends substantially in an axial direction between disk 131 and edge 137. Disk 131 and bottom wall 142 each extend substantially radially with respect to axis 133. Thus, shell 132 is substantially symmetric about axis 133. Bottom wall 142 has a downwardly facing bottom surface 146 and an upwardly facing top surface 148 as shown in FIG. 10. Disk 131 has a downwardly facing bottom surface 147 and an upwardly facing top surface 149 as shown best in FIG. 11. A portion of wall 136 extends downwardly from disk 131, and therefore, bottom edge 140 of wall 136 is positioned to lie below bottom surface 147.

Bottom edge 140 and bottom edge 137 are each formed to include four, relatively small notches 150 as shown in FIGS. 9–11. Each notch 150 associated with bottom edge 140 of wall 136 is aligned in a vertical plane with a companion notch 150 associated with wall 135. Each notch 150 is open at its bottom. In addition, each notch 150 is bounded by a pair of vertical side edges 152 and a horizontal upper edge 154. Upper edge 154 of each notch 150 associated with wall 136 is positioned below bottom surface 147 of disk 131 and above bottom edge 140 as shown in FIG. 11. Each notch 150 of the associated wall 135, 136 is circumferentially spaced apart from each of the next adjacent notches 150 of the same wall 135, 136 by ninety degrees. It is within the scope of this disclosure for more or less than four notches 150 to be provided along each of bottom edges 137, 140 of shell 132.

Illustrative main container wall 136 includes a first annular portion 156 extending axially upwardly from bottom edge 140, a second annular portion 158 extending axially downwardly from top edge 138, and a radially extending shoulder portion 160 that interconnects first and second annular portions 156, 158 as shown best in FIG. 10. Annular portion 158 is substantially cylindrical. Annular portion 156 is slightly frustoconical and therefore, tapers inwardly by a small amount from shoulder portion 160 to bottom edge 140. Wall 136 also includes an upper lip 166 that extends downwardly from top edge 138 by a small amount. Lip 166 is configured to retain a removable lid (not shown) that is coupled to container 130 in some embodiments.

Wall 135 of lower portion 128 is slightly frustoconical and tapers inwardly from disk 131 to bottom edge 137. Bottom wall 142 has a somewhat dome-shaped central portion 162 and a substantially flat portion 164 radially outward of central portion 162 as shown in FIG. 10. Upper edges 154 of notches 150 associated with wall 135 are positioned lower in elevation than bottom surface 146 of bottom wall 142 as shown in FIG. 10.

Image-carrying sheet 134 is molded into shell 132 as mentioned above. Specifically, sheet 134 is molded into portion 156 of wall 136 such that an external surface 168 of sheet 34, which faces away from drink-receiving space 144, is exposed to enable an image carried by or included in sheet 134 to be seen. In exemplary embodiments, sheet 134 is a lenticular lens sheet of material having an image with a 3-D effect. However, it is within the scope of this disclosure for sheet 134 to be any type of sheet that carries one or more images or has one or more images formed or printed thereon.

Sheet 134 is substantially similar to sheet 34 of container 30. Thus, sheet 134 has a top edge 170, shown in FIG. 10, a bottom edge 172, shown best in FIG. 11, and a pair of side edges (not shown) that are similar to side edges 74 of sheet 34 and that extend between top edge 170 and bottom edge 172. Sheet 134 wraps around almost all of portion 156 of container wall 136 as shown best in FIG. 9. However, each side edge of sheet 134 is spaced apart from and confronts the other side edge of sheet 134 such that a vertically extending gap is defined between the side edges.

The plastic material from which shell 132 is molded coats a back surface 176 of sheet 134 and fills the vertically extending space between the side edges of sheet 134. In addition, a portion of the plastic material from which shell 132 is molded fills the space between bottom edge 172 of sheet 134 and bottom edge 140 of wall 136. Similarly, a portion of the plastic material from which shell 132 is molded fills the space between top edge 170 of sheet 134 and shoulder portion 160. Thus, portion 156 of container wall 136 has a ring 178 of plastic material above top edge 170 of sheet 134, a ring 180 of plastic material beneath bottom edge 172 of sheet 134, and a ridge 182 of plastic material extending vertically between rings 178, 180 as shown in FIG. 9. The outer surfaces of ridge 182 and rings 178, 180 cooperate with external surface 168 of sheet 134 to provide container 130 with a generally smooth frustoconical outer surface beneath shoulder portion 160.

Container 130 is configured so that bottom edge 172 of sheet 134 is positioned to lie below bottom surface 147 of disk 131 and above bottom edge 140 of container wall 136 as shown in FIG. 11. Bottom edge 172 of sheet 134 will be either substantially coplanar with upper edges 154 of notches 150 associated with wall 136, as shown in FIG. 11 (in solid), or positioned slightly higher in elevation than upper edges 154 of notches 150 associated with wall 136, as shown in FIG. 11 (in phantom). If bottom edge 172 is positioned slightly higher in elevation than upper edges 154 of the associated notches 150, then a small portion 184 of the plastic material from which container 130 is molded fills the small vertical space between bottom edge 172 of sheet 134 and upper edges 154 of the associated notches 150 as shown in FIG. 9. Portions 184 interconnect the segments of ring 180 lying on either side of the notches 150 associated with wall 136.

Figure 12:
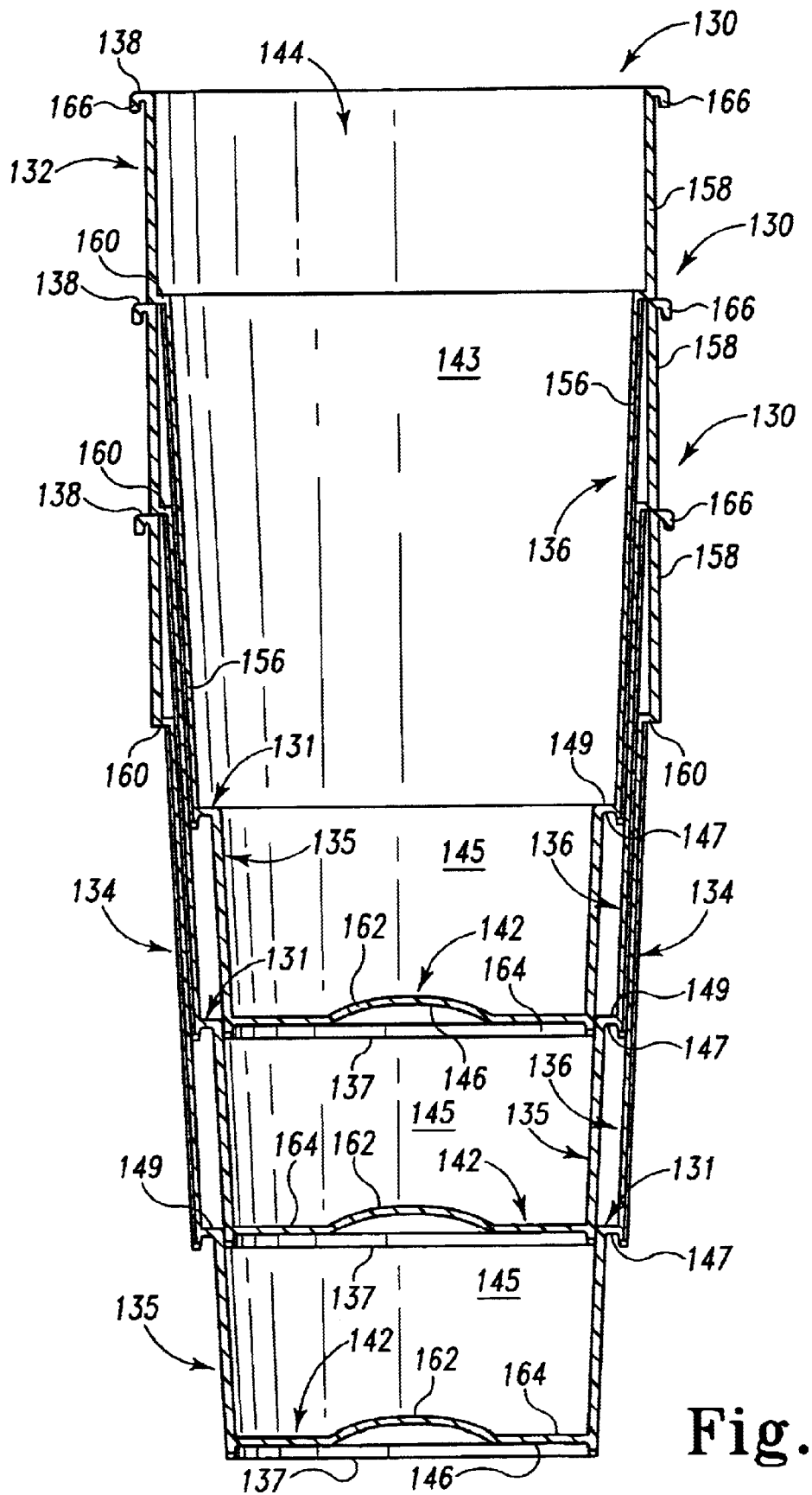
FIG. 12 is a cross sectional view of three stacked drink containers similar to the drink container of FIGS. 10 and 11.

Container 130 is stackable with other containers of similar or identical construction as shown in FIG. 12. When stacked with top edges 138 facing upwardly, as shown in FIG. 12, shoulder portion 160 of each container 130 engages top edge 138 of the next adjacent, underlying container 130. Contact between portions 160 and edges 138 prevents walls 135, 136 of one container 130 from becoming inadvertently tightly wedged against walls 135, 136, respectively, of the next adjacent container 130.

Figure 13:
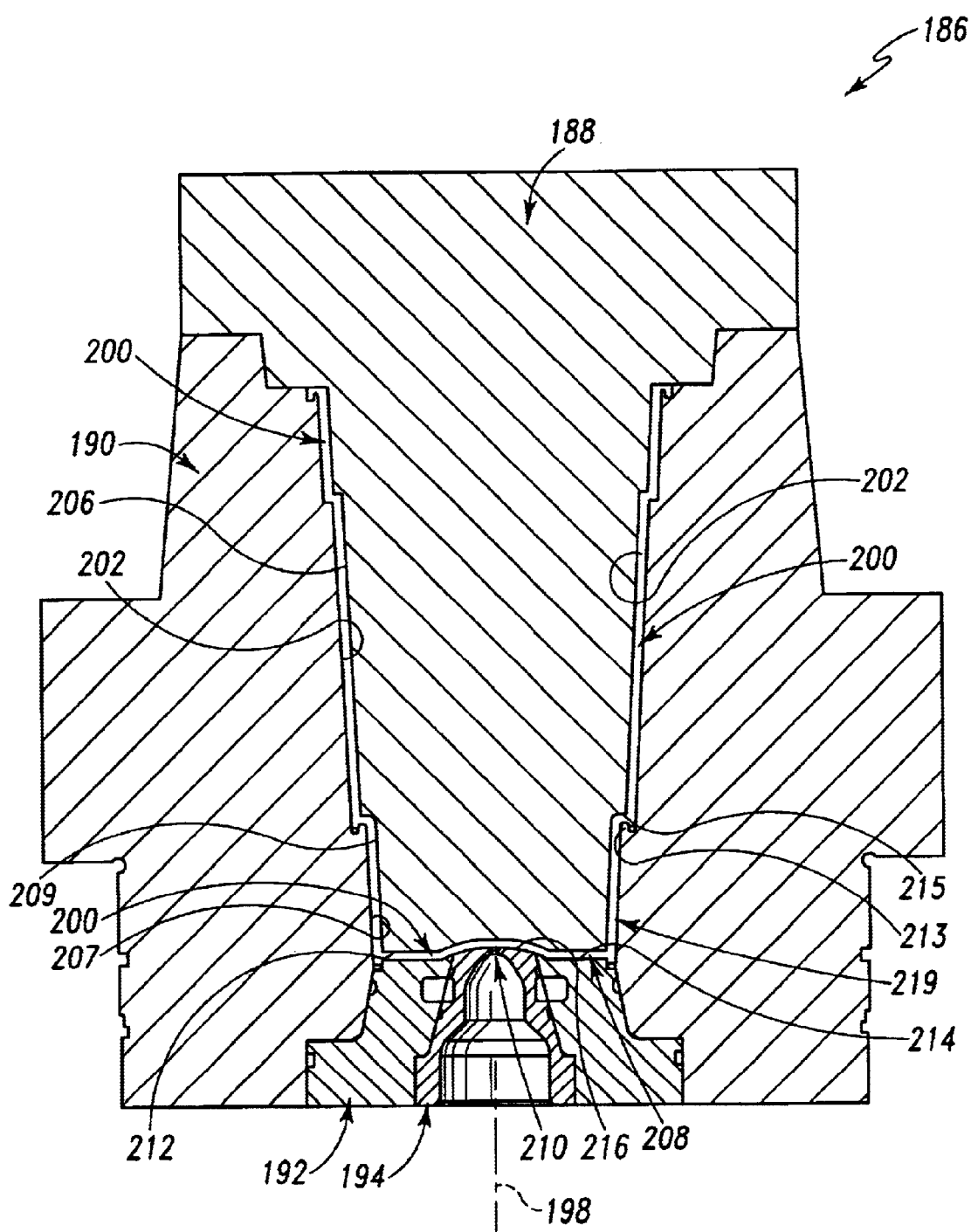
FIG. 13 is a cross sectional view, similar to FIG. 6, of a die set used to injection mold the drink container of FIGS. 10 and 11.

Container 130 is manufactured by an injection molding process using a die set 186, shown in FIG. 13, for example, having a male die 188, a female die 190, a gate 192, and a gate insert 194. Female die 190 has a bore or mold cavity 196, shown in FIG. 14, which defines an axis 198, shown in FIG. 13. Male die 188 is received in the upper portion of bore 196 and both gate 190 and gate insert 194 are received in the lower portion of bore 196 such that a plastic-receiving space 200 is created between portions of male die 188, female die 190, gate 192, and gate insert 194 as shown in FIG. 13.

Figure 14:
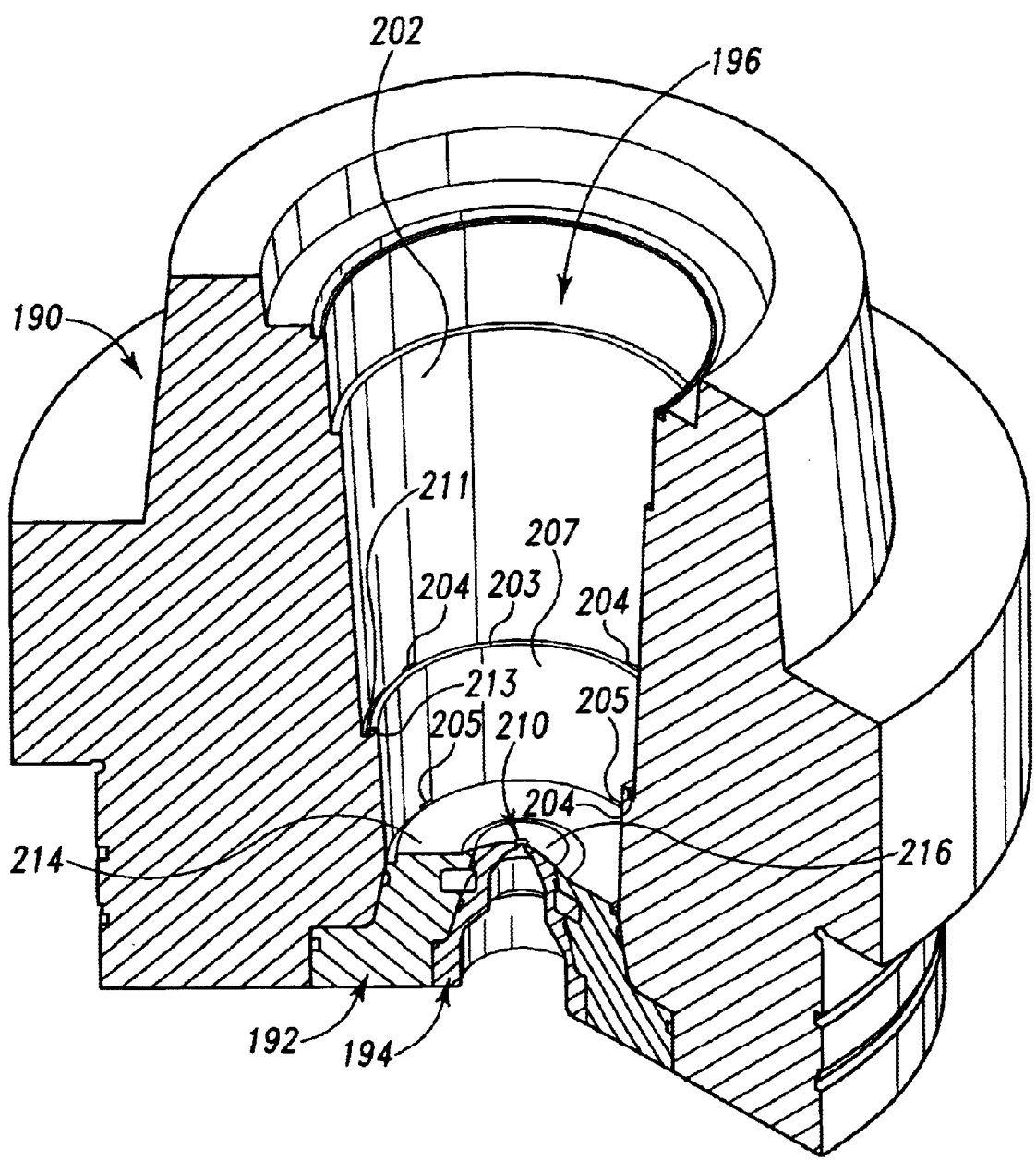
FIG. 14 is a perspective view of a part of the die set of FIG. 13, with portions broken away, showing a mold cavity of a female die of the die set with a gate and gate insert of the die set received in a lower portion of the mold cavity.
Figure 15:
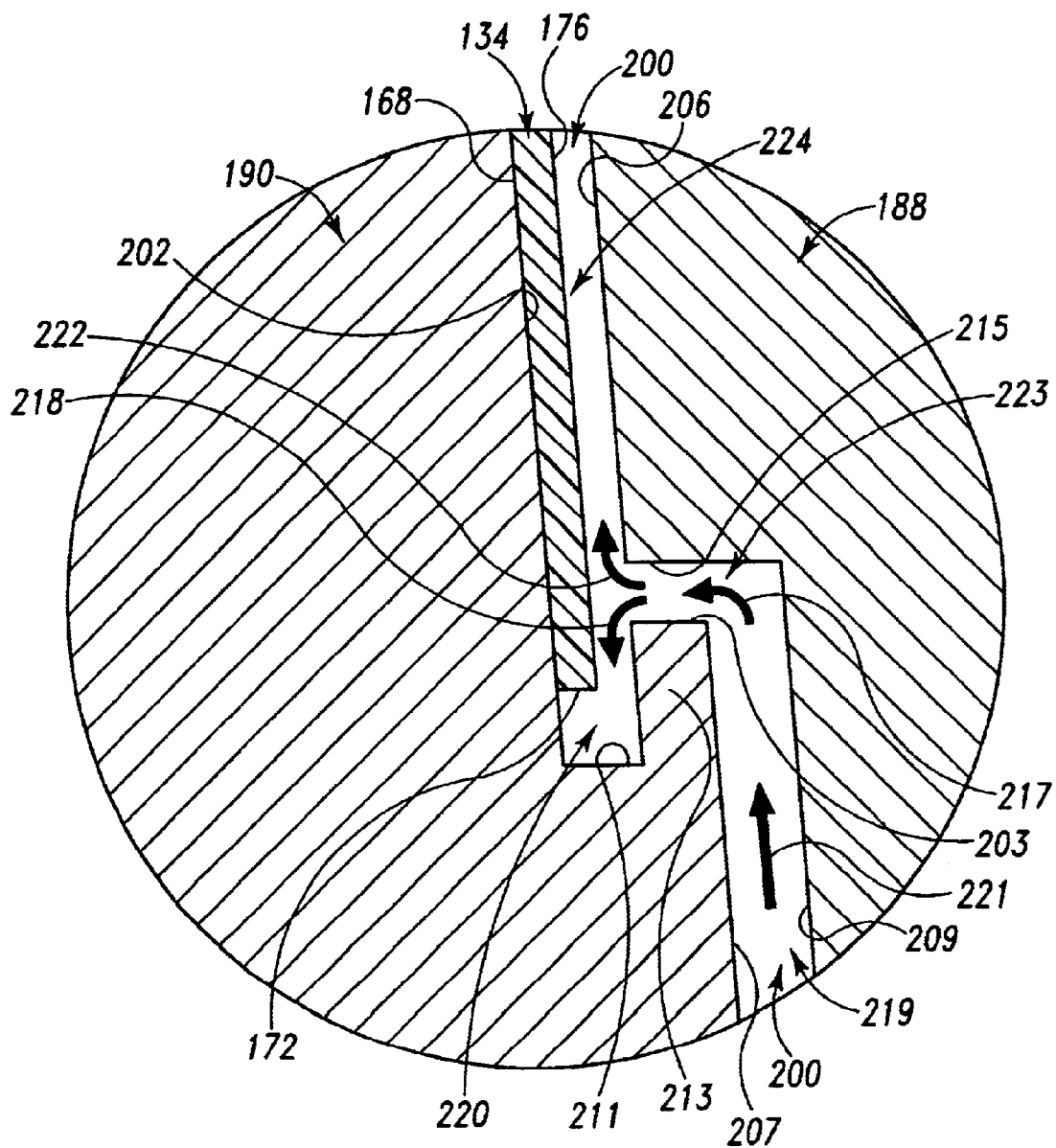
FIG. 15 is an enlarged cross sectional view of a portion of the die set of FIG. 13 showing a set of arrows indicating the direction of molten plastic flow in a portion of a plastic-receiving space during injection of the molten plastic into the plastic-receiving space to form the molded drink container.

After gate 190 and gate insert 194 are situated in the lower portion of mold cavity 196 and before male die 188 is lowered into mold cavity 196, sheet 134 is curled and inserted into mold cavity 196 so that external surface 168 of sheet 134 abuts a frustoconical surface 202 of female die 190. Female die 190 has an annular shoulder surface 211 extending radially inwardly from the lower end of surface 202 and a circular ridge wall 213 extending upwardly from shoulder surface 211 as shown in FIGS. 14 and 15. Female die 190 also has a set of four standoffs 204 extending radially between ridge wall 213 and surface 202. The upper surfaces of standoffs 204 are lower in elevation than an upper surface 203 of ridge wall 213. Bottom edge 172 of sheet 134 rests upon standoffs 204 when sheet 134 is inserted into mold cavity 196.

Gate 192 is shaped similarly to gate 92 of die set 86. Therefore, gate 192 has standoffs 205 as shown in FIG. 14.

In alternative embodiments, a second image-carrying sheet (not shown) is inserted into mold cavity 196 such that a bottom edge of the second sheet rests upon standoffs 205, a top edge of the second sheet is positioned below the upper surface of ridge wall 213, and a front surface of the second sheet abuts a frustoconical surface 207 of female die 190.

After sheet 134 is inserted into mold cavity 196, male die 188 is lowered into mold cavity 196 such that a first frustoconical surface 206 of male die 188 is spaced apart from back surface 176 of sheet 134, such that a second frustoconical surface 209 is spaced apart from surface 207 of female die, and such that a downwardly facing shoulder surface 215 is spaced apart from upper surface 203 of ridge wall 213 as shown in FIG. 15. Gate insert 194 has a small aperture 210 centered on axis 198. During the manufacture of container 130, molten plastic material is injected into plastic receiving space 200 through aperture 210 formed in gate insert 194. The injected molten plastic exiting aperture 210 flows radially outwardly in a horizontal disk-like portion 208 of plastic-receiving space 200 which is defined between a downwardly facing bottom surface 212 of male die 88 and upwardly facing surfaces 214, 216 of gate 192 and gate insert 194, respectively, as shown in FIG. 13.

Disk-like portion 208 has a domed central region and an annular outer region which terminates at a circular outer periphery. As the molten plastic flows from the circular outer periphery of disk-like portion 208 of space 200, some of the molten plastic flows downwardly to fill the space around standoffs 205 and some of the molten plastic flows upwardly in a direction indicated by arrow 221, shown in FIG. 15, into a lower annular portion 219 of space 200 defined between surface 207 of female die 190 and surface 209 of male die 188. When the molten plastic traveling upwardly in direction 221 reaches the top of portion 219 of space 200, the molten plastic flows radially outwardly in a direction indicated by arrow 217 into a disk-like portion 223 of space 200 defined above upper surface 203 of ridge wall 213 and below shoulder surface 215 of male die 188 as shown in FIG. 15. Disk-like portion 223 of space 200 has a circular outer periphery with a diameter that is larger than the circular outer periphery of disk-like portion 208.

As the molten plastic flows from the circular outer periphery of disk-like portion 223 of space 200, some of the molten plastic flows downwardly in a direction indicated by arrow 218, shown in FIG. 15, toward bottom edge 172 of sheet 134 and into an annular portion 220 of plastic-receiving space 200 and some of the molten plastic flows upwardly in a direction indicated by arrow 222, shown in FIG. 15, into a main annular portion 224 of space 200 and toward top edge 170 of sheet 134. Because bottom edge 172 of sheet 134 is beneath surfaces 203, 215 which define disk-like portion 223 of space 200, the molten plastic exiting the circular outer periphery of disk-like portion 223 of space 200 engages back surface 176 of sheet 134 before reaching the region of annular portion 220 beneath edge 172 and above surface 211. Thus, as portion 220 of space 200 fills with molten plastic, the lower portion of sheet 134 is prevented from moving or buckling inwardly toward centerline 198 of die set 186 because the portion of space 200 that is radially inward of the lower portion of sheet 134 is filled with molten plastic before the molten plastic reaches edge 172 of sheet 134.

Bottom edge 172 of sheet 134 engages standoffs 204 when sheet 134 is placed in mold cavity 196 as previously mentioned. Standoffs 204 are situated in annular portion 220 of space 200. Thus, the molten plastic flowing in direction 218 into annular portion 220 of space 200 flows around standoffs 204 which results in the formation in container 130 of the notches 150 associated with main container wall 136. Similarly, the molten plastic flowing around standoffs 205 results in the formation in container 130 of the notches 150 associated with wall 135. Notches 150 prevent a significant amount of water from pooling on surfaces 146, 147 when containers 130 are washed in a dishwasher. That is, when containers 130 having notches 150 are placed upside down in a dishwasher, a large portion of the water falling onto surfaces 146, 147 drains through the associated notches 150.

Some containers 130 have small portions 184 of plastic above upper edges 152 of the notches 150 associated with main container wall 136 and below bottom edge 172 of sheet 134 as mentioned above. Thus, during the molding process, sheet 134 sometimes lifts off of standoffs 204 by a slight amount which allows the molten plastic to fill the space created between bottom edge 172 of sheet 134 and standoffs 204. The same factors mentioned above that may contribute to sheet 34 lifting off of standoffs 104 may also contribute to sheet 134 lifting off of standoffs 204.

A suitable volume of molten plastic is injected into die set 186 to fill all of space 200 except for the portion of space 200 occupied by sheet 134. Thus, the molten plastic injected into space 200 covers the side edges and edges 170, 172 of sheet 134 and coats back surface 176 of sheet 134. After the molten plastic in space 200 cools and solidifies by a sufficient amount, die set 186 is disassembled and the completed container 130 is removed from mold cavity 196.

Figure 16:
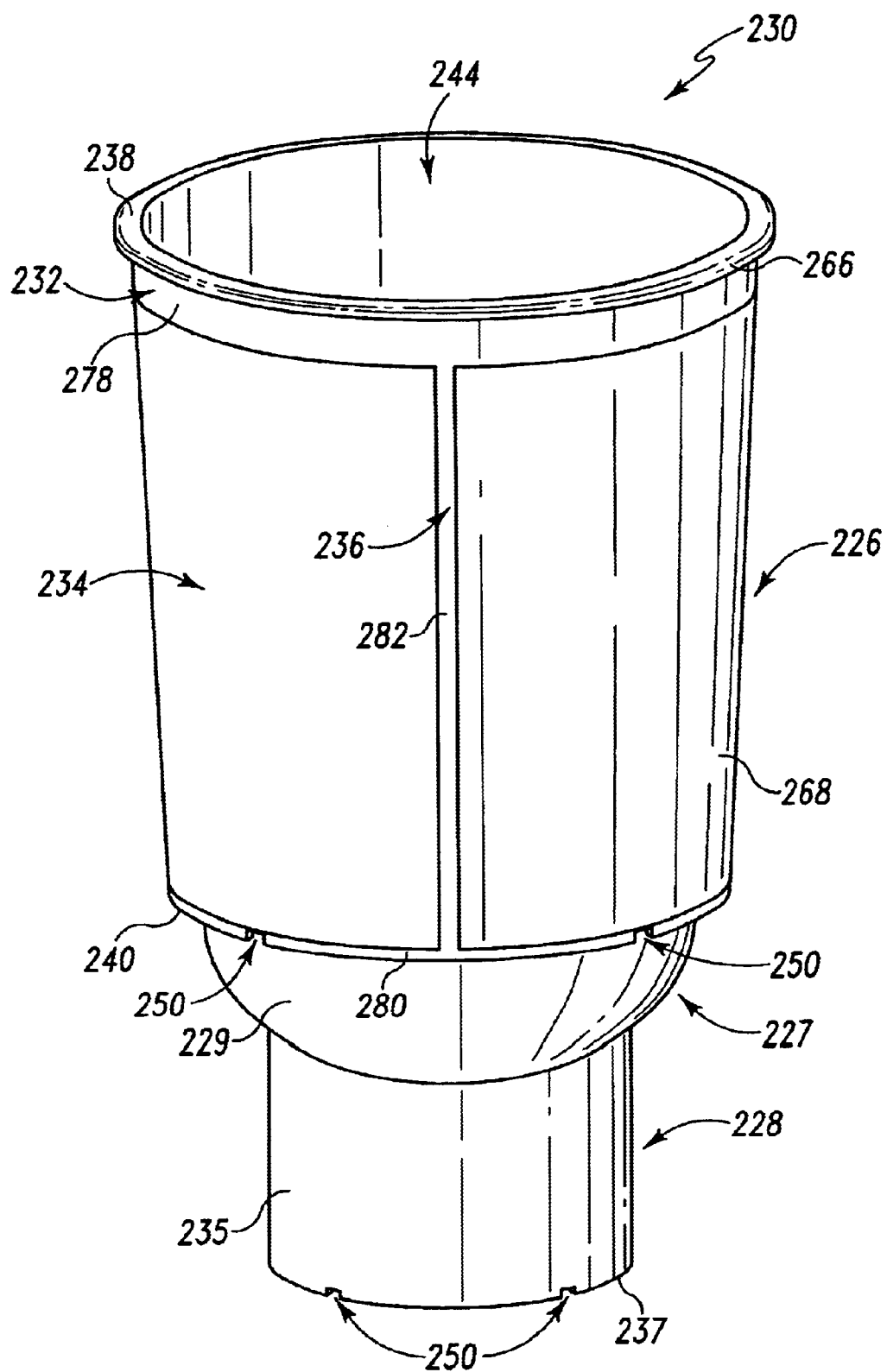
FIG. 16 is a perspective view showing another molded drink container according to the present disclosure having a large-diameter top portion with a main container wall into which an image-carrying sheet is molded, a small-diameter bottom portion, and a bowl-like intermediate portion interconnecting the top and bottom portions.
Figure 17:
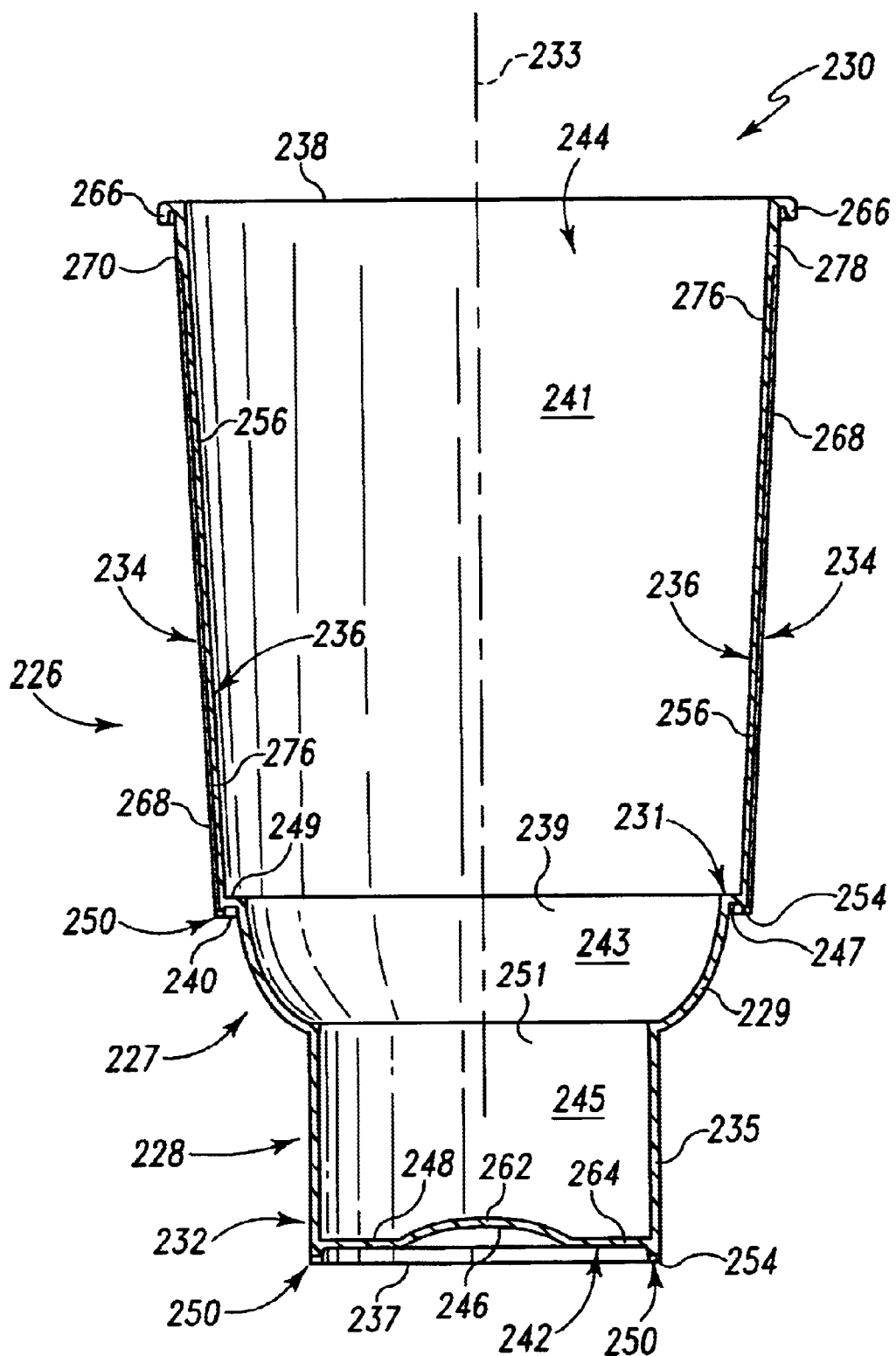
FIG. 17 is a cross sectional view of the molded drink container of FIG. 16, taken along a vertical plane passing through a central axis defined by the main container wall.
Figure 18:
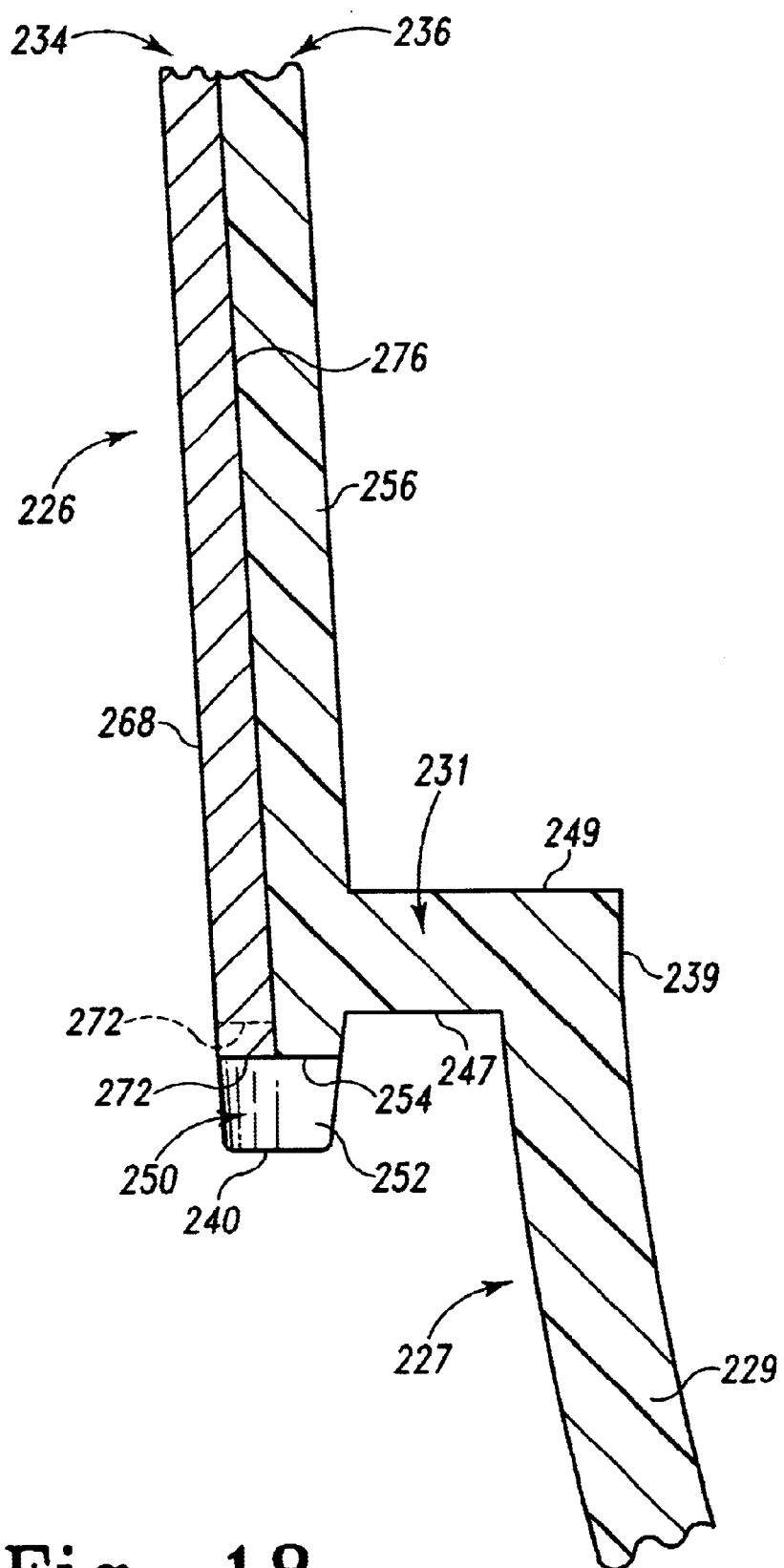
FIG. 18 is an enlarged cross sectional view of a portion of the molded drink container of FIG. 17 showing a radially extending disk of the molded drink container interconnecting a bottom region of the main container wall and an upper region of the bowl-like intermediate portion.

A second alternative embodiment of a molded drink container 230 in accordance with this disclosure is shown in FIGS. 16–18. Container 230 comprises a plastic shell 232 and an image-carrying sheet 234 molded into shell 232 as shown in FIG. 16. Shell 232 is made of any of the same materials from which shells 32, 132 of respective containers 30, 130 are made. Shell 232 has a large-diameter upper portion 226, a small-diameter lower portion 228 beneath upper portion 226, and a bowl-shaped portion 227 situated between portions 226, 228. Upper portion 226 of shell 232 includes a main container wall 236 having a substantially circular top edge 238 and a substantially circular bottom edge 240 as shown in FIG. 16. Top edge 238 defines an open mouth at the top of container 230.

Container 230 further comprises a radially extending disk 231 that interconnects top portion 226 and bowl-shaped portion 227 as shown in FIG. 17. Portion 227 of container 230 includes a wall 229 that extends downwardly and curves inwardly from the inner periphery of disk 231. Bottom portion 228 of shell 232 includes a wall 235 that extends downwardly from the bottom of wall 229 and that terminates at a substantially circular bottom edge 237. Lower portion 228 of shell 232 further includes a disk or bottom wall 242 that is appended to wall 235 near bottom edge 237. Disk 231 has a large central opening 239 and disk 242 is solid. Container 230 has a drink-receiving space 244 including an upper drink-receiving space 241 associated with upper portion 226, an intermediate drink-receiving space 243 associated with bowl-shaped portion 227, and a lower drink-receiving space 245 associated with lower portion 228 as shown in FIG. 17. Space 241 communicates with space 243 through opening 239. In addition, space 243 communicates with space 245 through an opening 251 in the bottom of portion 227.

Although container 230 may be sized to contain any desired amount of liquid in drink-receiving space 244, according to the illustrative embodiment of container 230, drink-receiving space 244 is configured to hold forty-four ounces of liquid. Thus, illustrative container 230 is well-suited for use as a super-size drinking cup at fast food restaurants, gas stations, movie theaters, sports venues, and the like. Lower portion 228 of container 230 is sized to fit into a standard-size drink holder formed in a drink-holding console of a motor vehicle, for example. Thus, even though illustrative container 230 is configured to hold the same amount of fluid as container 130, the outside diameter of portion 228 of container 230 is smaller than the outside diameter of portion 128 of container 130. As was the case with image-carrying sheets 34, 134 of containers 30, 130, respectively, image-carrying sheet 234 of container 230 may have any desired image in accordance with this disclosure.

Shell 232 has a vertical central axis 233 as shown in FIG. 17. Circular edges 237, 238, 240 and circular openings 239, 251 each have centers that lie on axis 233. In addition, wall 236 of upper portion 228 extends substantially in an axial direction between edges 238, 240 and wall 235 of lower portion 226 extends substantially in an axial direction between bowl-shaped portion 229 and edge 237. Disk 231 and bottom wall 242 each extend substantially radially with respect to axis 233. Thus, shell 232 is substantially symmetric about axis 233. Bottom wall 242 has a downwardly facing bottom surface 246 and an upwardly facing top surface 248 as shown in FIG. 17. Disk 231 has a downwardly facing bottom surface 247 and an upwardly facing top surface 249 as shown in FIGS. 17 and 18. A portion of wall 236 extends downwardly from disk 231, and therefore, bottom edge 240 of wall 236 is positioned to lie below bottom surface 247 of disk 231.

Bottom edge 240 and bottom edge 237 are each formed to include four, relatively small notches 250 as shown in FIGS. 16–18. Each notch 250 associated with bottom edge 240 of wall 236 is aligned in a vertical plane with a companion notch 250 associated with wall 235. Each notch 250 is open at its bottom. In addition, each notch 250 is bounded by a pair of vertical side edges 252 and a horizontal upper edge 254. Upper edge 254 of each notch 250 associated with wall 236 is positioned below bottom surface 247 of disk 231 and above bottom edge 240 of container wall 236 as shown in FIG. 18. Each notch 250 is circumferentially spaced apart from each of the next adjacent notches 250 by ninety degrees. It is within the scope of this disclosure for more or less than four notches 250 to be provided along each of bottom edges 237, 240 of shell 232.

Illustrative main container wall 236 includes an annular portion 256 extending substantially axially between top edge 238 and bottom edge 240 as shown best in FIG. 17. Annular portion 256 is slightly frustoconical and therefore, tapers inwardly by a small amount from top edge 238 to bottom edge 240. Wall 236 also includes an upper lip 266 that extends downwardly from top edge 238 by a small amount. As is the case with lips 66, 166 of containers 30, 130, respectively, lip 266 is configured to retain a removable lid (not shown) that is coupled to container 230 in some embodiments.

Wall 229 of bowl-shaped portion 227 has a concave inner surface and a convex outer surface. Wall 235 of lower portion 228 is slightly frustoconical and tapers inwardly from the bottom of portion 227 to bottom edge 237. Bottom wall 242 has a somewhat dome-shaped central portion 262 and a substantially flat portion 264 radially outward of central portion 262 as shown in FIG. 17. Upper edges 254 of notches 250 associated with wall 235 are positioned lower in elevation than bottom surface 246 of bottom wall 242 as also shown in FIG. 17.

Image-carrying sheet 234 is molded into shell 232 as mentioned above. Specifically, sheet 234 is molded into portion 256 of wall 236 such that an external surface 268 of sheet 234, which faces away from drink-receiving space 244, is exposed to enable an image carried by or included in sheet 234 to be seen. In exemplary embodiments, sheet 234 is a lenticular lens sheet of material having an image with a 3-D effect. However, it is within the scope of this disclosure for sheet 234 to be any type of sheet that carries one or more images or has one or more images formed or printed thereon.

Sheet 234 is substantially similar to sheet 34 of container 30. Thus, sheet 234 has a top edge 270, shown in FIG. 17, a bottom edge 272, shown best in FIG. 18, and a pair of side edges (not shown) that are similar to side edges 74 of sheet 34 and that extend between top edge 270 and bottom edge 272. Sheet 234 wraps around almost all of portion 256 of container wall 236 as shown best in FIG. 16. However, each side edge of sheet 234 is spaced apart from and confronts the other side edge of sheet 234 such that a vertically extending gap is defined between the side edges.

The plastic material from which shell 232 is molded coats a back surface 276 of sheet 234 and fills the vertically extending space between the side edges of sheet 234. In addition, a portion of the plastic material from which shell 232 is molded fills the space between bottom edge 272 of sheet 234 and bottom edge 240 of wall 236. Similarly, a portion of the plastic material from which shell 232 is molded fills the space between top edge 270 of sheet 234 and top edge 238 of wall 236. Thus, portion 256 of container wall 236 has a ring 278 of plastic material above top edge 270 of sheet 234, a ring 280 of plastic material beneath bottom edge 272 of sheet 234, and a ridge 282 of plastic material extending vertically between rings 278, 280 as shown in FIG. 16. The outer surfaces of ridge 282 and rings 278, 280 cooperate with external surface 268 of sheet 234 to provide container 230 with a generally smooth frustoconical outer surface beneath edge 238.

Container 230 is configured so that bottom edge 272 of sheet 234 is positioned to lie below bottom surface 247 of disk 231 and above bottom edge 240 of container wall 236 as shown in FIG. 18. Bottom edge 272 of sheet 234 will be either substantially coplanar with upper edges 254 of notches 250 associated with wall 236, as shown in FIG. 18 (in solid), or positioned slightly higher in elevation than upper edges 254 of notches 250 associated with wall 236, as shown in FIG. 18 (in phantom). If bottom edge 272 is positioned slightly higher in elevation than upper edges 254 of the associated notches 250, then a small portion (not shown) of the plastic material from which container 230 is molded fills the small vertical space between bottom edge 272 of sheet 234 and upper edges 254 of the associated notches 250.

Figure 19:
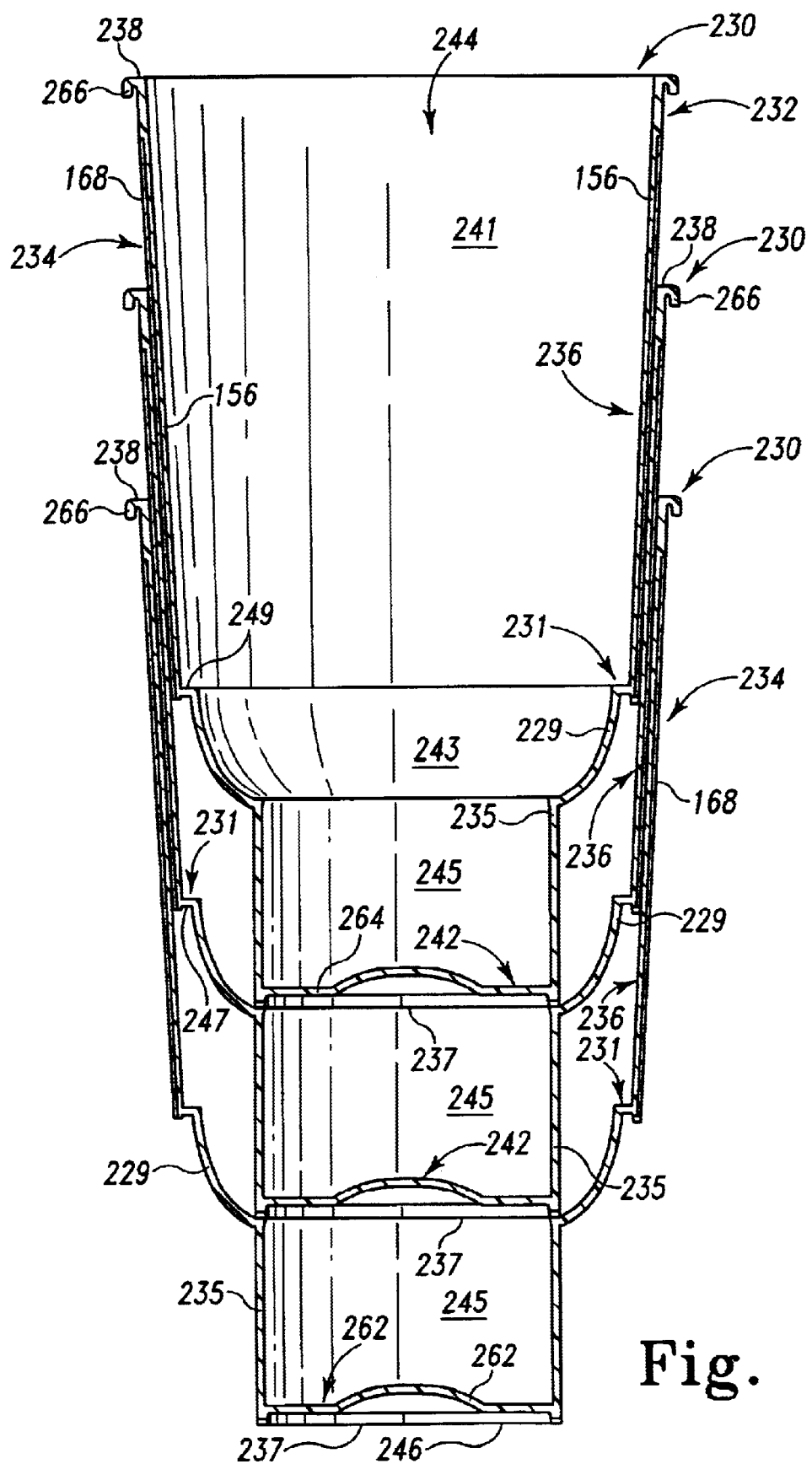
FIG. 19 is a cross sectional view of three stacked drink containers similar to the drink container of FIGS. 16 and 17.

Container 230 is stackable with other containers of similar or identical construction as shown in FIG. 19. When stacked with top edges 238 facing upwardly, as shown in FIG. 19, bottom edge 237 of each container 230 engages a lower portion of wall 229 of the next adjacent, underlying container 230. Contact between edges 237 and the lower portions of walls 229 prevents walls 235, 236 of one container 230 from becoming inadvertently tightly wedged against walls 235, 236, respectively, of the next adjacent container 230.

Figure 20:
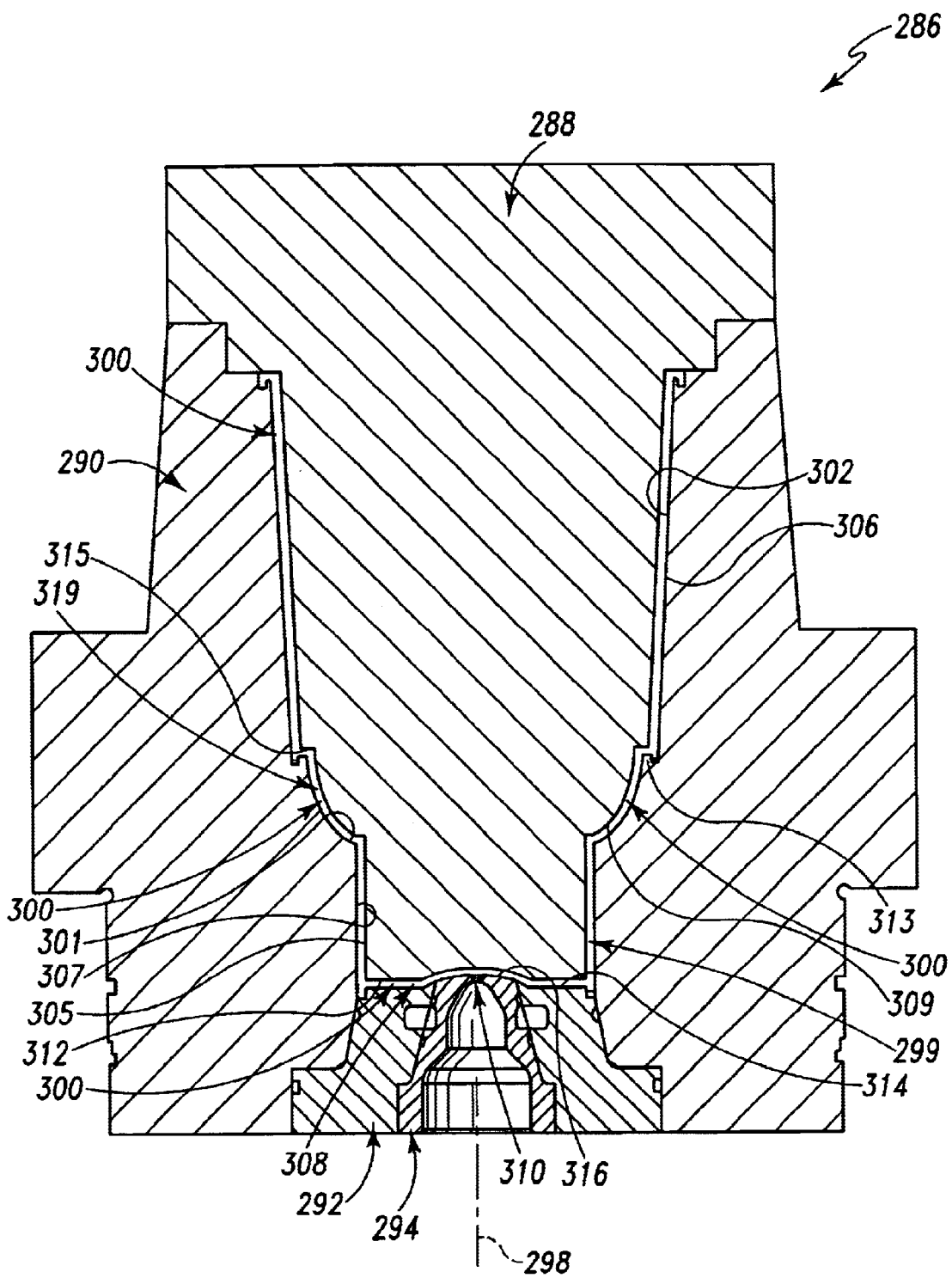
FIG. 20 is a cross sectional view, similar to FIGS. 6 and 13, of a die set used to injection mold the drink container of FIGS. 16 and 17.

Container 230 is manufactured by an injection molding process using a die set 286, shown in FIG. 20, for example, having a male die 288, a female die 290, a gate 292, and a gate insert 294. Female die 290 has a bore or mold cavity which defines an axis 298, shown in FIG. 20. Male die 288 is received in the upper portion of the bore of female die 290 and both gate 292 and gate insert 294 are received in the lower portion of the bore of female die 290 such that a plastic-receiving space 300 is created between portions of male die 288, female die 290, gate 292, and gate insert 294 as shown in FIG. 20.

Figure 21:
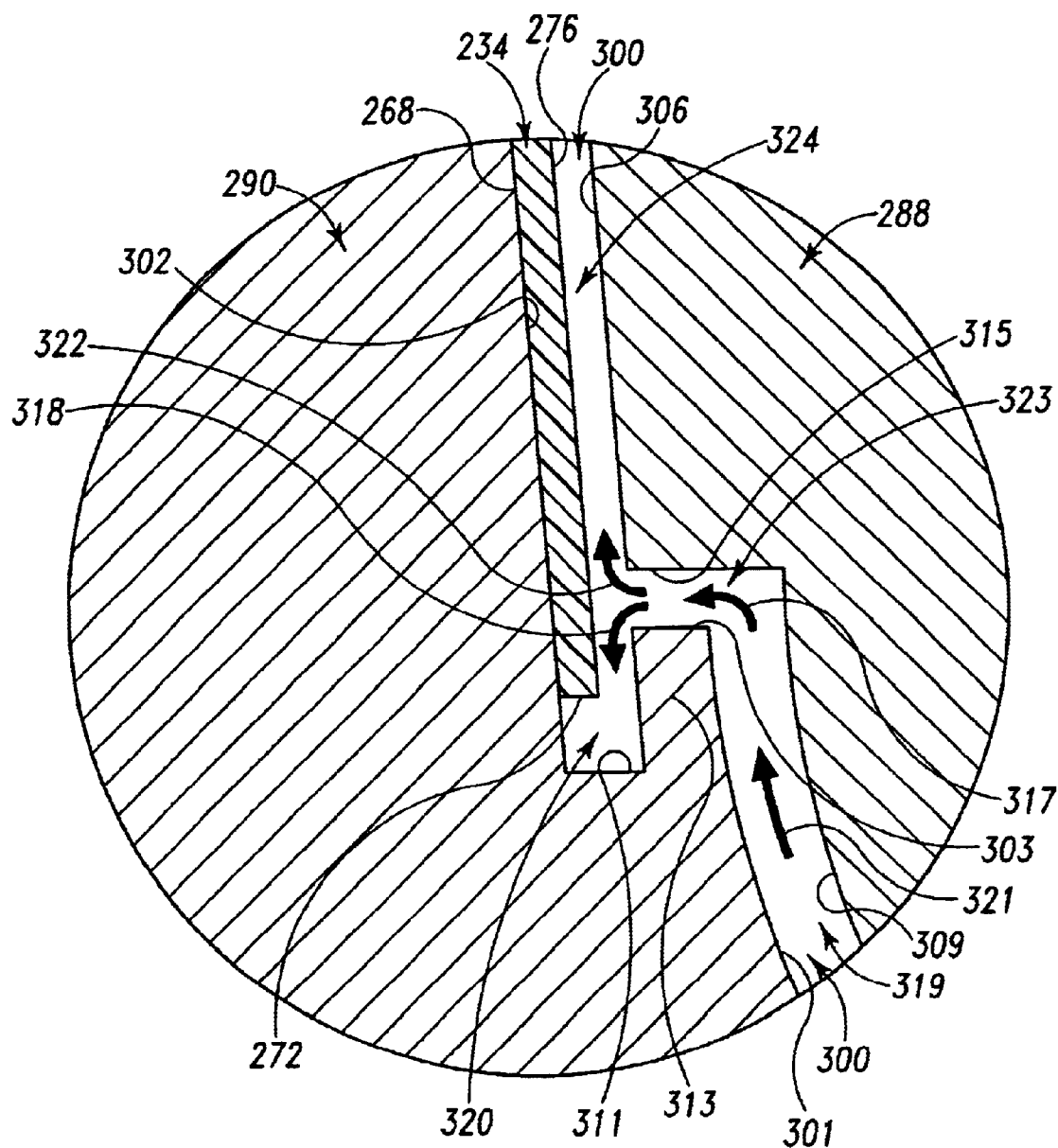
FIG. 21 is an enlarged cross sectional view of a portion of the die set of FIG. 20 showing a set of arrows indicating the direction of molten plastic flow in a portion of a plastic-receiving space during injection of the molten plastic into the plastic-receiving space to form the molded drink container.
Figure 1:
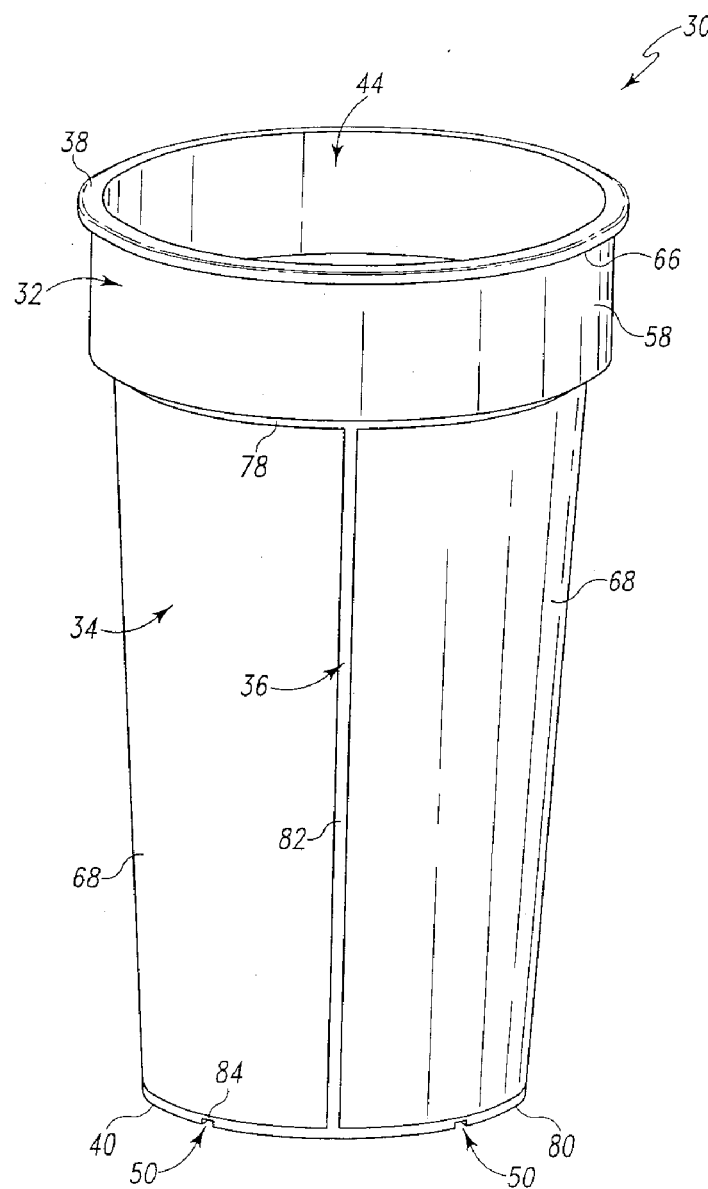
Figure 1:
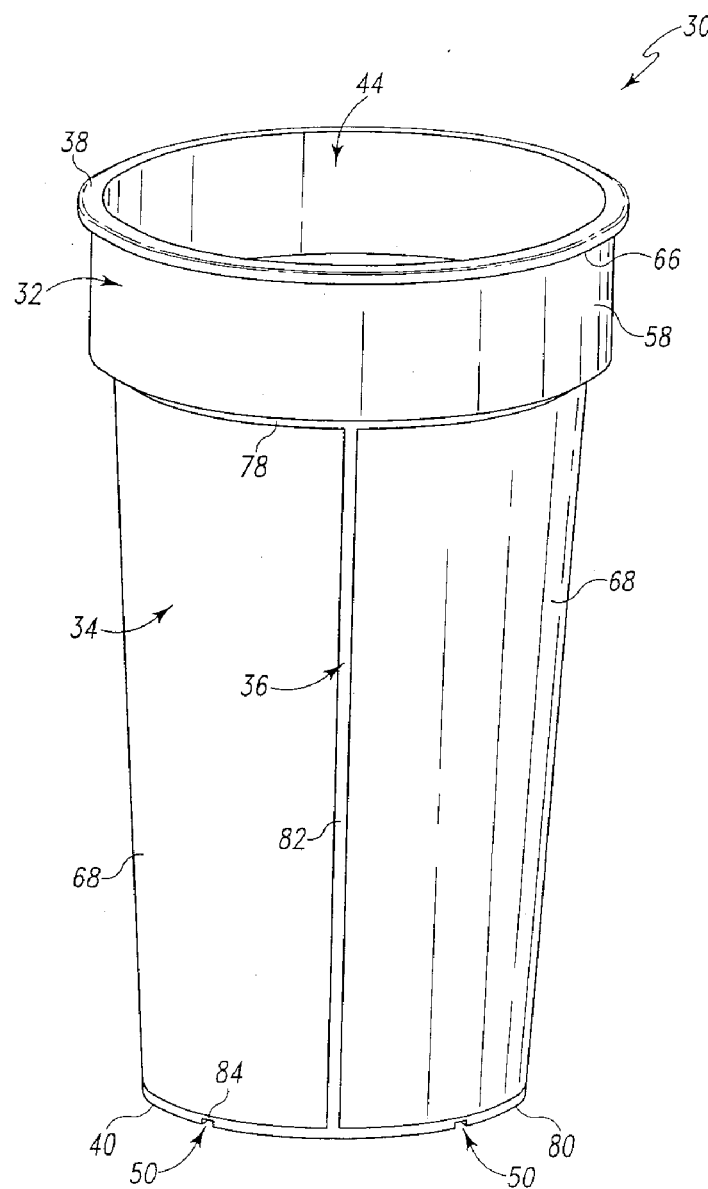

After gate 290 and gate insert 294 are situated in the lower portion of the mold cavity of female die 290 and before male die 288 is lowered into the mold cavity, sheet 234 is curled and inserted into the mold cavity so that external surface 268 of sheet 234 abuts a frustoconical surface 302 of female die 290. Female die 290 has an annular shoulder surface 311 extending radially inwardly from the lower end of surface 302 and a circular ridge wall 313 extending upwardly from shoulder surface 211 as shown in FIG. 21. Female die 290 also has a set of four standoffs (not shown), similar to standoffs 204 of female die 190, extending radially between ridge wall 313 and surface 302. The upper surfaces of the standoffs of female die 290 are lower in elevation than an upper surface 303 of ridge wall 313. Bottom edge 272 of sheet 234 rests upon the standoffs of female die 290 when sheet 234 is inserted into the associated mold cavity.

Gate 292 is shaped similarly to gate 92 of die set 86. Therefore, gate 292 has standoffs (not shown). In alternative embodiments, a second image-carrying sheet (not shown) is inserted into the mold cavity of female die 290 such that a bottom edge of the second sheet rests upon the standoffs of the associated gate 292, a top edge of the second sheet is positioned below a concave surface 301 of female die 290, and a front surface of the second sheet abuts a frustoconical surface 307 of female die 290.

After sheet 234 is inserted into the mold cavity of female die 290, male die 288 is lowered into the mold cavity such that a first frustoconical surface 306 of male die 288 is spaced apart from back surface 276 of sheet 234, such that a convex surface 309 is spaced apart from concave surface 301 of female die 290, and such that a downwardly facing shoulder surface 315 is spaced apart from upper surface 303 of ridge wall 313 as shown in FIG. 21. In addition, a second frustoconical surface 305 of male die 288 is spaced apart from surface 307 of female die 290 when male die 288 is lowered into the mold cavity of female die 290 as shown in FIG. 20.

Gate insert 294 has a small aperture 310 centered on axis 298. During the manufacture of container 230, molten plastic material is injected into plastic receiving space 300 through aperture 310. The injected molten plastic exiting aperture 310 flows radially outwardly in a horizontal disk-like portion 308 of plastic-receiving space 300 which is defined between a downwardly facing bottom surface 312 of male die 288 and upwardly facing surfaces 314, 316 of gate 292 and gate insert 294, respectively, as shown in FIG. 20. Disk-like portion 308 has a domed central region and an annular outer region which terminates at a circular outer periphery.

As the molten plastic flows from the circular outer periphery of disk-like portion 308 of space 300, some of the molten plastic flows downwardly to fill the space around the standoffs of gate 292 and some of the molten plastic flows upwardly into an annular portion 299 of space 300 defined between surfaces 305, 307. Continued injection of molten plastic through aperture 210 causes molten plastic to flow upwardly from portion 299 of space 300 into a bowl-shaped portion 319 of space 300 defined between surfaces 301, 309. The molten plastic flows upwardly in portion 319 of space 300 in a direction indicated by arrow 321, shown in FIG. 21. When the molten plastic traveling upwardly in direction 321 reaches the top of portion 319 of space 300, the molten plastic flows radially outwardly in a direction indicated by arrow 317 into a disk-like portion 323 of space 300 defined above upper surface 303 of ridge wall 313 and below shoulder surface 315 of male die 288 as shown in FIG. 21. Disk-like portion 323 of space 300 has a circular outer periphery with a diameter that is larger than the circular outer periphery of disk-like portion 308.

As the molten plastic flows from the circular outer periphery of disk-like portion 323 of space 300, some of the molten plastic flows downwardly in a direction indicated by arrow 318, shown in FIG. 21, toward bottom edge 272 of sheet 234 and into an annular portion 320 of plastic-receiving space 300 and some of the molten plastic flows upwardly in a direction indicated by arrow 322, shown in FIG. 21, into a main annular portion 324 of space 300 and toward top edge 270 of sheet 234. Because bottom edge 272 of sheet 234 is beneath surfaces 303, 315 which define disk-like portion 323 of space 300, the molten plastic exiting the circular outer periphery of disk-like portion 323 of space 200 engages back surface 276 of sheet 234 before reaching the region of annular portion 320 beneath edge 272 and above surface 311. Thus, as portion 320 of space 300 fills with molten plastic, the lower portion of sheet 234 is prevented from moving or buckling inwardly toward centerline 298 of die set 286 because the portion of space 300 that is radially inward of the lower portion of sheet 234 is filled with molten plastic before the molten plastic reaches edge 272 of sheet 234.

Bottom edge 272 of sheet 234 engages the standoffs of female die 290 when sheet 234 is placed in the mold cavity of female die 290 as previously mentioned. The same factors mentioned above that may contribute to sheet 34 lifting off of standoffs 104 may also contribute to sheet 234 lifting off of the associated standoffs of female die 290. The standoffs of female die 290 are situated in annular portion 320 of space 300. Thus, the molten plastic flowing in direction 318 into annular portion 320 of space 300 flows around the associated standoffs which results in the formation in container 230 of the notches 250 associated with main container wall 236. Similarly, the molten plastic flowing around the standoffs of gate 292 results in the formation in container 230 of the notches 250 associated with wall 235. Notches 250 prevent a significant amount of water from pooling on surfaces 246, 247 when containers 230 are washed in a dishwasher. That is, when containers 230 having notches 250 are placed upside down in a dishwasher, a large portion of the water falling onto surfaces 246, 247 drains through the associated notches 250.

A suitable volume of molten plastic is injected into die set 286 to fill all of space 300 except for the portion of space 300 occupied by sheet 234. Thus, the molten plastic injected into space 300 covers the side edges and edges 270, 272 of sheet 234 and coats back surface 276 of sheet 234. After the molten plastic in space 300 cools and solidifies by a sufficient amount, die set 286 is disassembled and the completed container 230 is removed from the mold cavity of female die 290.

Although illustrative sheets 34, 134, 234 are each one-piece sheets, it is within the scope of this disclosure for multiple sheets to be molded into container walls 36, 136, 236 of containers 30, 130, 230, respectively. In some such embodiments having multiple sheets molded into container walls 36, 136, 236, each sheet is preformed with the appropriate amount of curvature to match the curvature of the associated wall 36, 136, 236.

Although certain illustrative embodiments have been described in detail above, variations and modifications exist within the scope and spirit of this disclosure as described and as defined in the following claims.

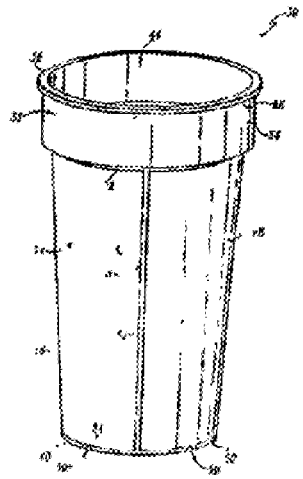

What is claimed is:

1. A molded drink container comprising
a main container wall having a top edge and a bottom edge,
a bottom wall coupled to the main container wall, the main container wall cooperating with the bottom wall to define a drink-receiving space above the bottom wall, the bottom wall having a bottom surface facing away from the drink-receiving space, the bottom edge of the main container wall being positioned to lie below the bottom surface, and
at least one image-carrying sheet molded into the main container wall, the image-carrying sheet having a top edge, a bottom edge, and an outer surface that faces away from the drink-receiving space, the bottom edge of the image-carrying sheet being positioned to lie above the bottom edge of the main container wall and below the bottom surface of the bottom wall, the bottom edge of the main container wall being formed to include at least one notch which is positioned to lie beneath the bottom edge of the at least one image-carrying sheet.

2. The molded drink container of claim 1, wherein the at least one notch includes four notches.

3. The molded drink container of claim 1, wherein a portion of the main container wall extending upwardly from the bottom edge of the main container wall is frustoconical and the top edge of the at least one image-carrying sheet is longer than the bottom edge of the at least one image-carrying sheet.

4. The molded drink container of claim 1, wherein the main container wall includes a first annular portion extending upwardly from the bottom edge of the main container wall, a second annular portion above the first annular portion, and a shoulder portion interconnecting the first and second annular portions, and the top edge of the at least one image-carrying sheet is positioned to lie beneath the shoulder portion.

5. The molded drink container of claim 1, wherein the at least one image-carrying sheet comprises at least one sheet of lenticular lens material.

6. The molded drink container of claim 1, wherein the at least one notch is bounded by a pair of vertical side edges and a horizontal upper edge.

7. The molded drink container of claim 1, wherein the main container wall comprises a plastic material in which the at least one-image carrying sheet is embedded.

8. The molded drink container of claim 7, wherein the at least one image-carrying sheet comprises at least one sheet of lenticular lens material.

9. The molded drink container of claim 1, wherein at least one of the top edge and the bottom edge of the container wall are circular.

10. The molded drink container of claim 1, wherein the bottom wall has a somewhat dome-shaped central portion and a substantially flat portion radially outward of the central portion.

11. The molded drink container of claim 1, wherein the at least one image-carrying sheet has a first side edge, the image-carrying sheet has a second side edge, and the at least one image-carrying sheet wraps around almost all of the container wall such that the first side edge confronts the second side edge.

12. A molded container comprising
a container wall defining an axis of the molded container, the container wall having a top edge and a bottom edge, a radially extending disk having an outer periphery appended to the container wall between the top edge and the bottom edge of the container wall, an image-carrying sheet molded into the container wall, the image-carrying sheet having a top edge above the disk and a bottom edge below the disk, and a bottom portion appended to the disk and extending downwardly therefrom, the disk comprising a central opening, the bottom portion being formed to include a lower drink-receiving space, a portion of the container wall above the disk defining an upper drink-receiving space, and the lower drink-receiving space being in fluid communication with the upper drink-receiving space through the central opening.

13. The molded container of claim 12, wherein a portion of the container wall extending downwardly from the disk is formed to include at least one notch which is positioned to lie beneath the bottom edge of the image-carrying sheet.

14. The molded container of claim 12, wherein a majority of the bottom portion is situated below the bottom edge of the image-carrying sheet.

15. The molded container of claim 12, wherein the bottom portion includes a wall having a bottom edge and the bottom edge is formed to include at least one notch.

16. The molded drink container of claim 12, wherein the image-carrying sheet comprises a sheet of lenticular lens material.

17. The molded drink container of claim 12, wherein the container wall comprises a plastic material in which the image-carrying sheet is embedded.

18. The molded drink container of claim 17, wherein the image-carrying sheet comprises at least one sheet of lenticular lens material.

19. The molded drink container of 12, wherein at least part of the bottom portion is adapted to be received in a drink holder provided in an armrest of a seat in a movie theater.

20. The molded drink container of claim 12, wherein at least part of the bottom portion is adapted to be received in a drink holder provided in a motor vehicle.

21. The molded drink container of claim 12, wherein the bottom portion comprises a frustoconical wall.

22. The molded drink container of claim 21, wherein the bottom portion comprises a bottom wall coupled to the frustoconical wall, the bottom wall has a somewhat dome-shaped central portion, and the bottom wall has a substantially flat portion extending between the central portion and the frustoconical wall.

23. The molded drink container of claim 12, wherein the bottom portion comprises a bowl-shaped wall coupled to the disk.

24. The molded drink container of claim 23, wherein the bottom portion comprises a generally cylindrical wall extending downwardly from the bowl-shaped wall.

* * * * *

UNITED STATES PATENT AND TRADEMARK OFFICE
CERTIFICATE OF CORRECTION

PATENT NO.   : 6,718,664 B2
DATED        : April 13, 2004
INVENTOR(S)  : Bruce A. Williams It is certified that error appears in the above-identified patent and that said Letters Patent is hereby corrected as shown below:

Drawings,
Delete fig. 1 and substitute fig. 1 as shown on attached page.

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO. : 6,718,664 B2
APPLICATION NO. : 10/039216
DATED : April 13, 2004
INVENTOR(S) : Bruce A. Williams It is certified that error appears in the above-identified patent and that said Letters Patent is hereby corrected as shown below:

Delete the title page and substitute therefor the attached title page.

<u>Drawings,</u>
Delete fig. 1 and substitute fig. 1 as shown on attached page.

This certificate supersedes Certificate of Correction issued November 23, 2004.

Signed and Sealed this

First Day of May, 2007

JON W. DUDAS
*Director of the United States Patent and Trademark Office*

(12) United States Patent
Williams

(10) Patent No.: US 6,718,664 B2
(45) Date of Patent: Apr. 13, 2004

(54) CONTAINER HAVING IMAGE-CARRYING SHEET AND METHOD OF MANUFACTURING SUCH CONTAINER

(75) Inventor: Bruce A. Williams, Shelbyville, IN (US)

(73) Assignee: Williams Industries, Shelbyville, IN (US)

(*) Notice: Subject to any disclaimer, the term of this patent is extended or adjusted under 35 U.S.C. 154(b) by 0 days.

(21) Appl. No.: 10/039,216

(22) Filed: Jan. 3, 2002

(65) Prior Publication Data

US 2003/0121189 A1 Jul. 3, 2003

(51) Int. Cl.⁷ .................................. G09F 3/00
(52) U.S. Cl. .................. 40/324; 40/454; D7/396.2
(58) Field of Search ............... 40/324, 310, 306, 40/454; D7/396.2

(56) References Cited

U.S. PATENT DOCUMENTS

| | | |
|---|---|---|
| 2,499,453 A | 3/1950 | Bonnet |
| 3,119,195 A | 1/1964 | Braunhut |
| 4,218,204 A | 8/1980 | Edwards |
| 4,236,954 A | 12/1980 | Edwards |
| 4,680,000 A | 7/1987 | Nowicki et al. |
| 4,721,451 A | 1/1988 | Darr et al. |
| 4,737,098 A | 4/1988 | Oles et al. |
| 4,769,205 A | 9/1988 | Oles et al. |
| 4,973,241 A | 11/1990 | Keyser |
| 5,003,915 A | 4/1991 | D'Amato et al. |
| 5,032,344 A | 7/1991 | Kaminski |
| 5,098,302 A | 3/1992 | Sekiguchi |
| 5,113,213 A | 5/1992 | Sandor et al. |
| 5,181,471 A | 1/1993 | Sillars |
| 5,192,554 A | 3/1993 | Savich |
| 5,330,799 A | 7/1994 | Sandor et al. |
| 5,332,542 A | 7/1994 | Yamanaka et al. |
| 5,364,274 A | 11/1994 | Sekiguchi |
| 5,368,798 A | 11/1994 | Mizukoshi et al. |
| 5,448,844 A * | 9/1995 | Miller et al. ............ 40/306 |
| 5,457,515 A | 10/1995 | Quadracci et al. |
| 5,494,445 A | 2/1996 | Sekiguchi et al. |
| 5,520,876 A | 5/1996 | Dobler |
| 5,525,383 A | 6/1996 | Witkowski |

(List continued on next page.)

FOREIGN PATENT DOCUMENTS

| | | |
|---|---|---|
| EP | 0812568 A1 | 12/1997 |
| EP | 0818788 A1 | 1/1998 |
| EP | 1014169 A1 | 6/2000 |
| WO | WO 97/02312 | 1/1997 |
| WO | WO 99/41156 | 8/1999 |
| WO | WO 00/09319 | 2/2000 |
| WO | WO 00/63016 | 10/2000 |
| WO | WO 01/96079 A2 | 12/2001 |

OTHER PUBLICATIONS

Provisional patent application No. 60/233,293, filed Sep. 15, 2000, for "Plastic Container Having an Integral Lenticular Sheath and Method for Making Same", Inventors Falzarano and Milisi (copy unavailable).

Provisional patent application No. 60/257,588, filed Dec. 22, 2000, for "Method of Protecting Ink and Providing Enhanced Bonding During Molding of Lenticular Lens Sheets in Plastic Objects", Inventor Richard Guest (copy unavailable).

Prior art Atlanta Hawks cup, two digital photos, date unknown (Photos A and B).

Prior art ice cream containers, four digital photos, date unknown (Photos C, D, E, F).

*Primary Examiner*—Gary Hoge
(74) *Attorney, Agent, or Firm*—Barnes & Thornburg LLP

(57) ABSTRACT

Drink containers with a variety of shapes are disclosed. Each drink container has a shell and an image-carrying sheet molded into the shell. In some embodiments, the image-carrying sheet is a sheet of lenticular lens material. A method of manufacturing the various illustrative drink containers is also disclosed.

24 Claims, 21 Drawing Sheets